(12) United States Patent
Chittar et al.

(10) Patent No.: US 9,715,510 B2
(45) Date of Patent: Jul. 25, 2017

(54) FINDING PRODUCTS THAT ARE SIMILAR TO A PRODUCT SELECTED FROM A PLURALITY OF PRODUCTS

(71) Applicant: eBay Inc., San Jose, CA (US)

(72) Inventors: Naren Chittar, San Jose, CA (US); Sanjay Pundlkrao Ghatare, San Jose, CA (US); Ryan McDonald, San Francisco, CA (US); John Roper, Sammamish, WA (US); Michael Schmitz, Everett, WA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/266,093

(22) Filed: Sep. 15, 2016

(65) Prior Publication Data

US 2017/0004632 A1    Jan. 5, 2017

Related U.S. Application Data

(63) Continuation of application No. 14/329,837, filed on Jul. 11, 2014, now Pat. No. 9,471,604, which is a
(Continued)

(51) Int. Cl.
*G06K 9/00* (2006.01)
*G06F 17/30* (2006.01)
(Continued)

(52) U.S. Cl.
CPC .... *G06F 17/30277* (2013.01); *G06F 17/3025* (2013.01); *G06F 17/30244* (2013.01);
(Continued)

(58) Field of Classification Search
CPC ......... G06F 17/30905; G06F 17/30749; G06F 17/30761; G06F 17/30522; G06F 17/3053; G06F 17/30554; G06F 17/30643; G06F 17/30035; G06F 17/3025; G06F 17/30277; G06F 17/30244; G06F 17/30259; G06F 17/30256; G06F 17/30663; G06F 17/30687; G06F 17/30864; G06F 17/30017; G06F 17/30247; G06F 17/30253

See application file for complete search history.

(56) References Cited

U.S. PATENT DOCUMENTS

| 6,763,148 B1 * | 7/2004 | Sternberg | G06F 17/30247 382/293 |
| 8,073,818 B2 * | 12/2011 | Duan | G06F 17/30253 707/687 |
| 2008/0301128 A1 * | 12/2008 | Gandert | G06F 17/30265 |

* cited by examiner

*Primary Examiner* — Duy M Dang
(74) *Attorney, Agent, or Firm* — Schwegman, Lundberg & Woessner, P.A.

(57) ABSTRACT

A system and method, which may be an offline method, extracts relevant image features about listing items in a network-based publication system for enabling image similarity searching of such listing items. When a seller lists an item, an image of the item is uploaded and may be sent to a picture processing service, which generates several digests. The digests are compressed data structures each representing a particular image feature such as edge, color, texture, or words. These digests are then stored in a search database, where the digests can be used to retrieve listings by image similarity at scale. A similar process can be performed for a query listing for searching the search database for items similar to the query listing.

14 Claims, 22 Drawing Sheets

Related U.S. Application Data continuation of application No. 14/133,455, filed on Dec. 18, 2013, now Pat. No. 9,280,563, which is a continuation of application No. 13/073,911, filed on Mar. 28, 2011, now Pat. No. 8,861,844.

(60) Provisional application No. 61/318,762, filed on Mar. 29, 2010.

(51) Int. Cl.
*G06K 9/32* (2006.01)
*G06K 9/46* (2006.01)
*G06T 7/90* (2017.01)

(52) U.S. Cl.
CPC ......... *G06K 9/3208* (2013.01); *G06K 9/4642* (2013.01); *G06K 9/4652* (2013.01); *G06T 7/90* (2017.01)

FIG. 17

FINDING PRODUCTS THAT ARE SIMILAR TO A PRODUCT SELECTED FROM A PLURALITY OF PRODUCTS

CROSS-REFERENCE TO RELATED APPLICATIONS

This application is a continuation of U.S. patent application Ser. No. 14/329,837, filed Jul. 11, 2014, which is a continuation of U.S. patent application Ser. No. 14/133,455, filed on Dec. 18, 2013, which is a continuation of U.S. patent application Ser. No. 13/073,911, filed on Mar. 28, 2011, which claims the benefit of U.S. Provisional Application Ser. No. 61/318,762, filed on Mar. 29, 2010, the benefit of priority of each of which is claimed hereby, and each are incorporated herein by reference in its entirety.

BACKGROUND

As the use of network-based publication systems and marketplaces, such as on-line commerce services or auction services expands, and the volume of item listings in such applications increases, the speed, ease, and convenience with which information can be retrieved from such marketplaces increases in importance to customers.

Item listings in such network-based marketplaces typically include details of a particular item which is, for example, up for sale or auction. These details are typically stored in text format and include a description of the item together with other information, such as the price, useful to a potential buyer in assessing the item listing. In addition, item listings often include visual material related to the item, typically in the form of a photograph, drawings, or video clips.

The use of images in this context has customarily been limited to the provision of information about item listings to customers, but it would be useful to employ images associated with item listings for additional purposes, such as for image-based searching or for the automatic identification of images for fraud protection purposes.

BRIEF DESCRIPTION OF DRAWINGS

FIG. 17 is an illustration of a second ecommerce site page showing part of a similarity search.

DETAILED DESCRIPTION

Figure 1:
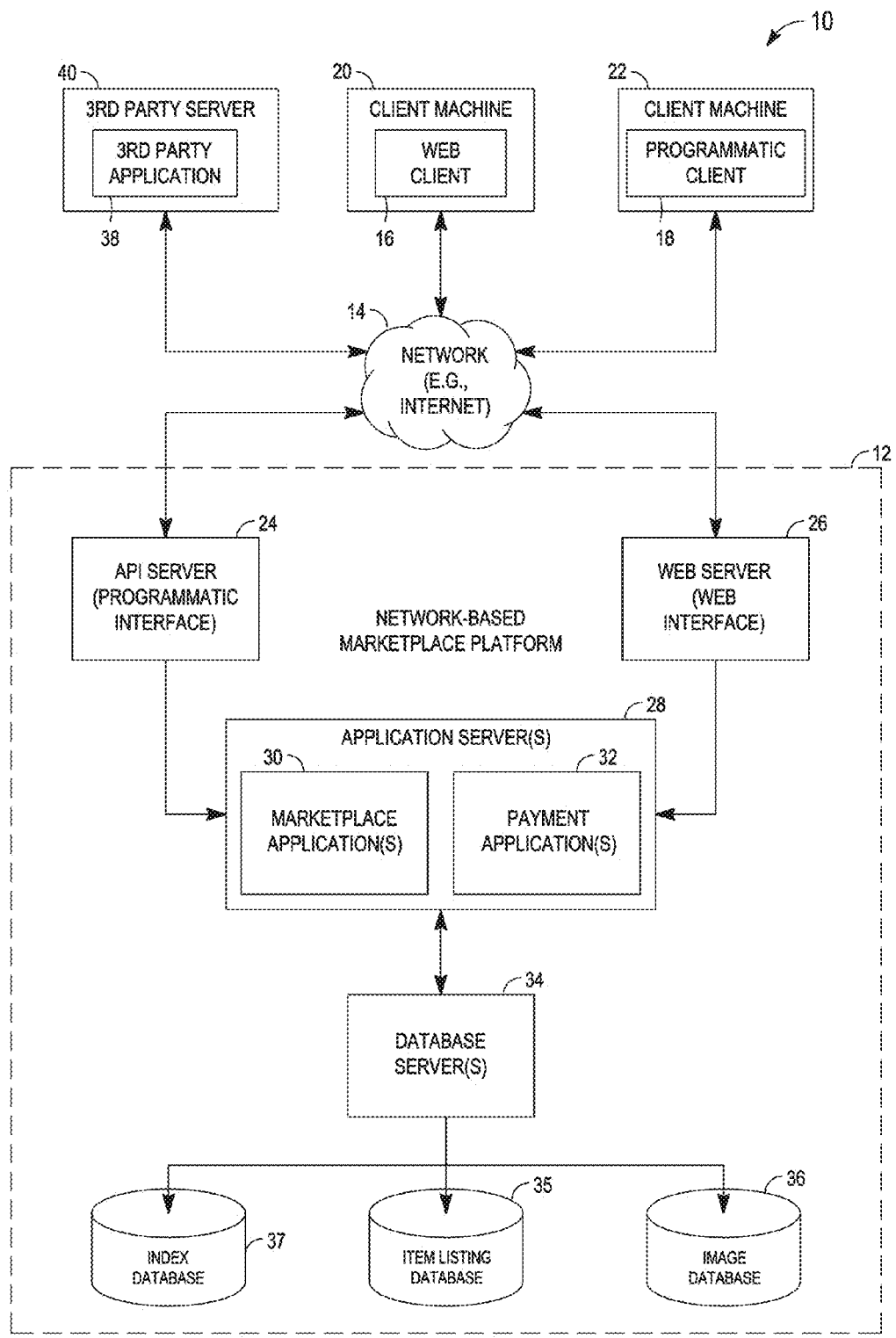
FIG. 1 is a block diagram illustrating a publication system in the example form of network-based marketplace system according to an example embodiment.

In the following description, for purposes of explanation, numerous specific details are set forth in order to provide a thorough understanding of some example embodiments. It will be evident, however, to one skilled in the art that the present embodiments may be practiced without these specific details.

Index sets are associated with their respective images in a so-called reverse indexing arrangement, in which an index database contains a single entry for each unique index set or feature vector, with all the images that contain that particular index set or feature vector being listed against the entry.

When, for instance, a query image is subsequently presented in order to search for identical or similar images in the image database, the query image is itself parsed or processed to generate multiple feature vectors or sets of index values for the query image. The index sets for the query image are thus generated in a similar manner to the generation of index sets for the index database.

To identify images similar to the query image, all of the query image's index sets are compared to index sets in the index database. When commonality is identified between a query image index set and a database index vector, a hit count is incremented for each of the images associated with that index set in the index database. The database images are ranked in order of hit count, so that the result of the search are those item listings whose images have index sets showing the greatest commonality with the index sets of the query image.

In an example embodiment, the index sets are generated by first performing an edge detection algorithm on the image and then normalizing the image. Thereafter, the image is divided into a raster of cells or sub-portions at a resolution which is usually significantly lower than its native pixel resolution, so that each cell or sub-portion comprises many image pixels. The raster may typically be a 10 by 10 grid of cells. Next, an index value is assigned to each cell based on an image attribute, typically a light intensity value, of the underlying image pixels. The result is therefore a grid of index values. Thereafter, sets of index values (i.e. feature vectors) are created from respective overlapping portions of the grid of index values. This process can be explained as a sliding window that is moved over the grid to isolate two dimensional selections or portions of index values at a time, the portions overlapping and covering the entire grid. The index values in each selection or portion together form one feature vector or set of index values. In an example embodiment, the moving window is three by three cells in size, so that each feature vector is constituted by nine index values.

The system and method thus provides for image comparison in a publication system, such as a network-based marketplace, which requires significantly less processing power, and is therefore faster than image comparison based on native image data, while returning results with relatively high accuracy. The method is furthermore relatively robust and insensitive to scaling and resolution loss. A two-pass search is performed, based on a query that includes a query image. The results of the searching are provided, the results including image members of the set of images similar to the query image. If an end signal is not received, a further two-pass search can be performed based on a subsequent query having a subsequent query image. The subsequent query image may be one of the set of images similar to the query image.

Architecture

One example embodiment of a distributed network implementing image-based indexing for item listings in a network-based marketplace is illustrated in the network diagram of FIG. 1, which depicts a system 10 using a client-server type architecture. A commerce platform, in the example form of a network-based marketplace platform 12, provides server-side functionality, via a network 14 (e.g., the Internet) to one or more clients. As illustrated, the platform 12 interacts with a web client 16 executing on a client machine 20 and a programmatic client 18 executing on a client machine 22. In one embodiment, web client 16 is a web browser, but it may employ other types of web services.

Turning specifically to the network-based marketplace platform 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to a number of databases, in particular an item listing database 35, an image database 36, and an index database 37. The item listing database 35 stores data indicative of item listings for items which are offered for sale or auction on the platform 12. Each item listing includes, inter alia, a text description of the relevant item and metadata categorizing the item. The image database 36 includes images associated with respective item listings in the item listing database 35. The images in the image database 36 may be standard format image files such as JPEG files. The index database 37 contains index data relating to images in the image database to permit image-based searching of the image database 36. The format of index data in the index database is described in more detail below.

The marketplace applications 30 provide a number of marketplace functions and services to users that access the marketplace platform 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace platform 12, it will be appreciated that, in alternative embodiments, the payment applications 32 may form part of a payment service that is separate and distinct from the marketplace platform 12.

Further, while the system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities. Additionally, while example embodiments are described with respect to a marketplace platform 12, alternative embodiments may be contemplate use on a publication platform or other non-commerce platforms.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace platform 12 in an off-line manner, and to perform batch-mode communications between the programmatic client 18 and the network-based marketplace platform 12.

FIG. 1 also illustrates a third party application 38, executing on a third party server machine 40, as having programmatic access to the network-based marketplace via the programmatic interface provided by the API server 24. For example, the third party application 38 may, utilizing information retrieved from the network-based marketplace platform 12, support one or more features or functions on a website hosted by the third party. The third party website may, for example, provide one or more promotional, marketplace or payment functions that are supported by the relevant applications of the network-based marketplace platform 12.

Figure 2:
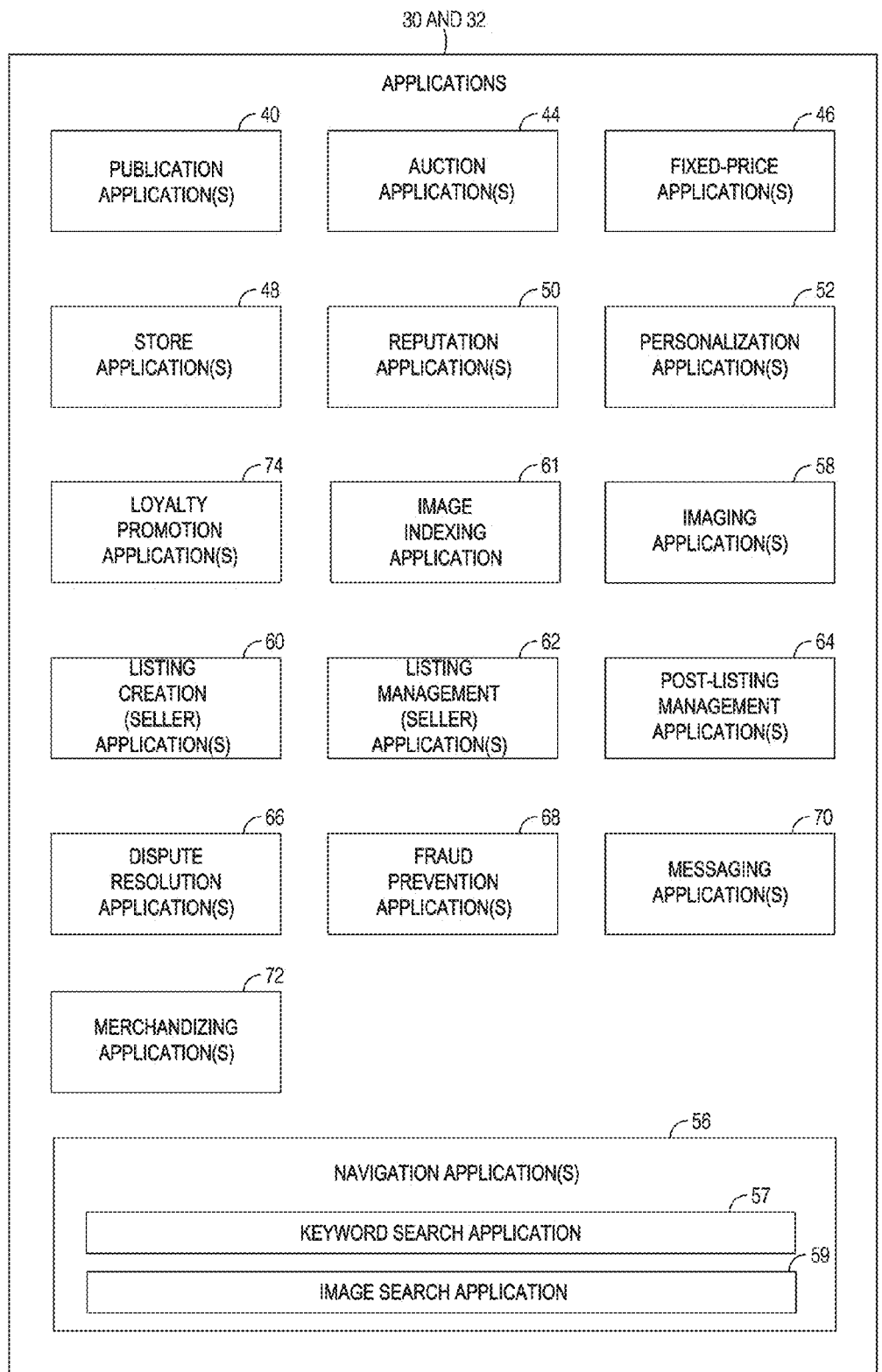
FIG. 2 is a diagrammatic representation of marketplace and payment applications which may form part of the example embodiment of FIG. 1.

FIG. 2 is a block diagram illustrating multiple marketplace and payment applications 30 and 32 that, in one example embodiment, are provided as part of the network-based marketplace platform 12. The marketplace platform 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include at least one publication application 41 and one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace platform 12 to establish, build and maintain reputations, which may be made available and published to potential trading partners. Consider that where, for example, the network-based marketplace platform 12 supports person-to-person trading, users may have no history or other reference information whereby the trustworthiness and credibility of potential trading partners may be assessed. The reputation applications 50 allows a user, for example through feedback provided by other transaction partners, to establish a reputation within the network-based marketplace platform 12 over time. Other potential trading partners may then reference such a reputation for the purposes of assessing credibility and trustworthiness.

Personalization applications 52 allow users of the marketplace platform 12 to personalize various aspects of their interactions with the marketplace platform 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace and other parties.

In one embodiment, the network-based marketplace platform 12 may support a number of marketplaces that are customized, for example, for specific geographic regions. A version of the marketplace may be customized for the United Kingdom, whereas another version of the marketplace may be customized for the United States. Each of these versions may operate as an independent marketplace, or may be customized (or internationalized) presentations of a common underlying marketplace.

Navigation of the network based-marketplace may be facilitated by one or more navigation applications 56. For example, a keyword search application 57 enables keyword searches of listings published via the marketplace platform 12. Similarly, an image search application 59 enables an image-based search of item listings published via the marketplace platform 12. To perform an image-based search, a user will typically submit a query image, whereupon the image search application 59 may compare the query image to images in the image database to produce a result list of item listings based on a similarity ranking between the query image and the images associated with the respective item listings. The comparison ranking is established by parsing or processing the query image to provide index data, and thereafter comparing the query image's index data to pre-compiled index data for the listing images, as described in more detail below. A browse application allows users to browse various category, catalogue, or inventory data structures according to which listings may be classified within the marketplace platform 12. Various other navigation applications may be provided to supplement the search and browsing applications.

In order to make listings, available via the network-based marketplace, as visually informative and attractive as possible, as well as to enable image-based searching, the marketplace applications 30 may include one or more imaging applications 58, which users may use to upload images for inclusion within listings. Images thus uploaded are stored in the image database 36, each image being associatively linked to at least one item listing in the item listing database 35. One of the imaging applications 58 also operates to incorporate images within viewed listings. The imaging applications 58 may also support one or more promotional features, such as image galleries that are presented to potential buyers. For example, sellers may pay an additional fee to have an image included within a gallery of images for promoted items.

The marketplace platform 12 may also include an image indexing application 61 to parse or process images uploaded via the image application 58, as well as to parse or process query images submitted via the image search application 59. The result of processing images by the image indexing application 61 is index data which is stored in the index database 37. Particular processes for indexing images, as well as the format of index data, are discussed in more detail below.

Listing creation applications 60 allow sellers conveniently to author listings pertaining to goods or services that they wish to transact via the marketplace platform 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assists sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace. One of the fraud prevention applications 68 may include automatic image comparison, by use of index data produced by the image indexing application 61 and stored in the index database 37. Such image comparison may be used by the fraud prevention application 68 automatically to detect listing images similar to the query image, and to alert a fraud assessor to such image listings, so that the human assessor can examine the identified item listing for assessing whether or not the identified item listing is a fraudulent listing.

Messaging applications 70 are responsible for the generation and delivery of messages to users of the network-based marketplace platform 12, such messages for example advising users regarding the status of listings at the marketplace (e.g., providing "outbid" notices to bidders during an auction process or providing promotional and merchandising information to users).

Merchandising applications 72 support various merchandising functions that are made available to sellers to enable sellers to increase sales via the marketplace platform 12. The merchandising applications 72 also operate the various merchandising features that may be invoked by sellers, and may monitor and track the success of merchandising strategies employed by sellers.

Figure 3:
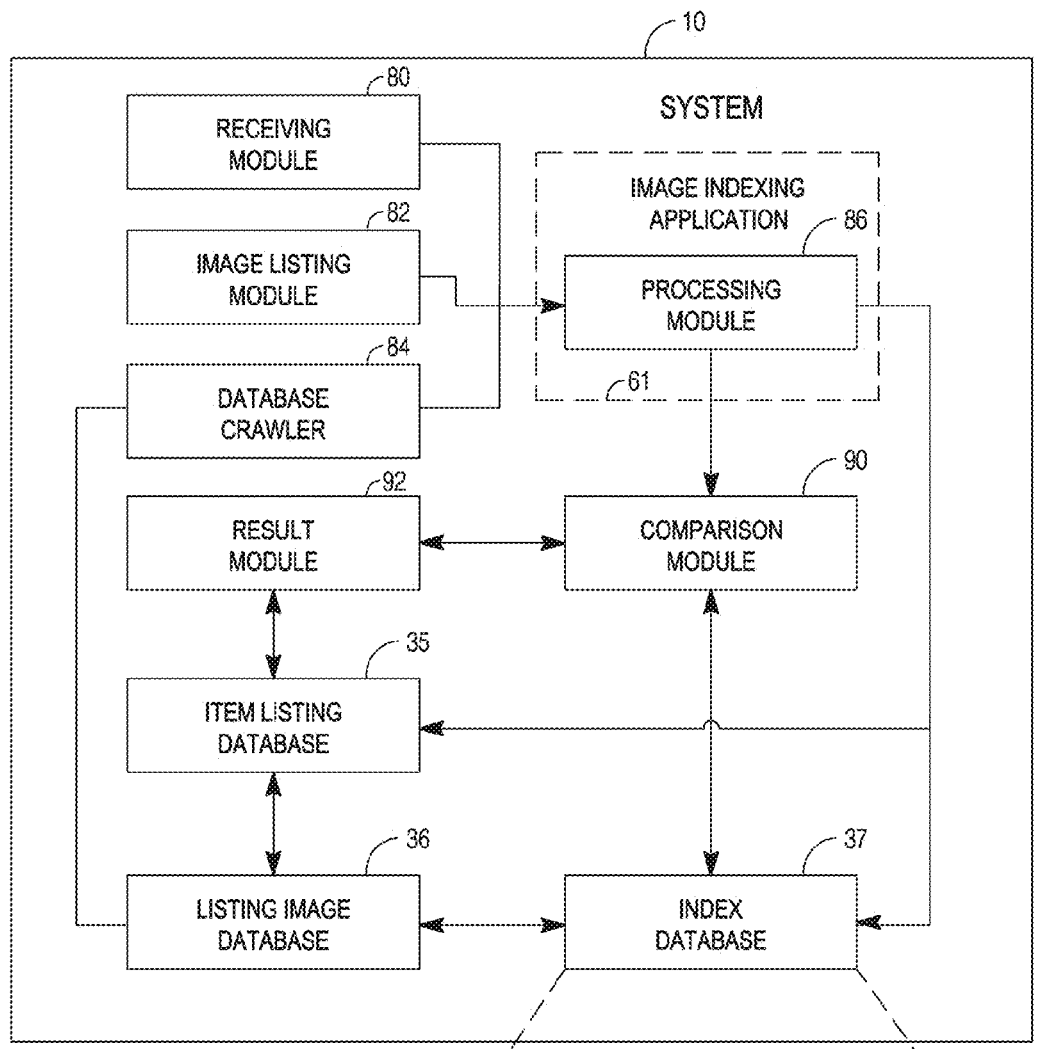
FIG. 3 is a diagrammatic representation of functional models and databases which may form part of the example embodiment of FIG. 1.

FIG. 3 is a high-level entity-relationship diagram, illustrating the relationship between the databases 35 to 37 and several functional modules forming part of the applications 30 and 32. The system includes a receiving module 80, which may form part of the image search application 59 (FIG. 2), for receiving a listing query which includes a query image. Query images which may be submitted to the receiving module 80 are typically electronic image files in a standard format, such as JPEG, GIF, TIFF, etc.

The receiving module 80 is operatively connected to a processing module 86, which may form part of the image indexing application 61, for processing images to generate index data for the images. An example method of processing images by the processing module 86 to generate the index data is described in more detail below. An image listing module 82, which may form part of the listing creation application 60 of FIG. 2, is operatively connected to the processing module 86 to communicate to the processing module 86 images forming part of newly created item listings. The system further includes a database crawler 84 which serves to interrogate the listing image database 36 in order to identify images in the listing image database 36 which have not yet been processed by the image indexing application 61, and for which there is thus no associated index data in the index database 37. It will be appreciated that indexing of images in accordance with an example embodiment may in certain instances be implemented in a network-based marketplace having large numbers of existing listing images for which there are, of course, no index data. To permit image-based searching of the listing image database 36 through the use of index data, the database crawler may continually locate and submit un-indexed legacy images in the listing image database 36 and pass them to the processing module for imaging. It should be noted accordingly that although image database 36 is illustrated in the figures by a single element, the image database 36 may be provided by any number of databases distributed through a network.

The processing module 86 is configured to parse or process images submitted to it to generate index data in the form of a number of a feature vector or index sets 88 for each image. In an example embodiment, each index set 88 comprises a sequence of nine index values, as shown in FIG. 3. These index sets 88 are also referred to as feature vectors or image fingerprints, and the terms "index set", "set of index values", "feature vector," and "digest" are used interchangeably in this document to refer to the results of indexing of images by the processing module 86.

The processing module 86 is in communication with the index database 37, to communicate index data generated by the processing module 86 to the index database 37 for storage. In an example embodiment, index data is related in the index database 37 to images stored in the listing image database 36 in a reverse-indexing format. The data format in the index database 37 may be in a spatial data structure, such as a two-dimensional k-d tree, to facilitate searching of the database 37. As illustrated in FIG. 3, the index database has stored therein a single entry for each unique feature vector 88, with each entry listing all of the database images which share that feature vector 88. For example with reference to FIG. 3, it will be understood that one of the feature vectors 88 produced by processing of an image with the filename IMG#23, stored in the image database 36, is [0, 0, 0, 2, 6, 12, 15, 13, 15], and that this feature vector is also one of the feature vectors 88 produced by processing of IMG#3012. It should be appreciated that multiple feature vectors 88 are generated by the processing of each image, and that a particular image will thus be listed in the index database against each of the multiple feature vectors 88 thus produced. For instance, the example given in FIG. 3 shows that the results of indexing of IMG#3012 include feature vector [0, 0, 0, 2, 6, 12, 15, 13, 15] and feature vector [4, 10, 17, 13, 9, 0, 0, 13, 15].

Each entry in the index database 37 is linked to at least one image in the listing image database 36. Further, the images stored in the image database 36 are linked to associated item listings in the item listing database 35. As discussed above, each item listing may comprise information about a particular item which is offered for sale or auction on the marketplace platform 12, such as a description of the item, at least one category of the item, a brand name of the item, etc. In the example embodiment, entries in the respective databases 35 to 37 are linked by use of image filenames as linking data. A person skilled in the art will appreciate that, in other embodiments, any appropriate data structure (e.g. relational databases or tables) may be used to link images in the image database 36 to, on the one hand, respective item listings and to, on the other hand, index data in the index database 37.

A comparison module 90 is in communication with both the processing module 86 and the index database 37, to compare index data for a query image with the index data in the index database 37 for finding database images similar to the query image. The comparison module 90, in use, produces a ranking of database images according to similarity to the query image. This ranking is achieved by comparing the feature vectors 88 of the query image, which is generated by the processing module 86, with feature vector entries in the index database 37 in accordance with a comparison method which is described in more detail below.

The system 10 also includes a result module 92 for delivering to a user the results of a search query which includes a query image. The result module 92 is configured to return query search results as item listings ranked in order of the similarity of their respective images to the query image, as determined by the comparison module 90. The search results may be delivered by the user in a format of the user's choosing, such as, for instance, via e-mail or in http format on a web browser application.

Figure 4:
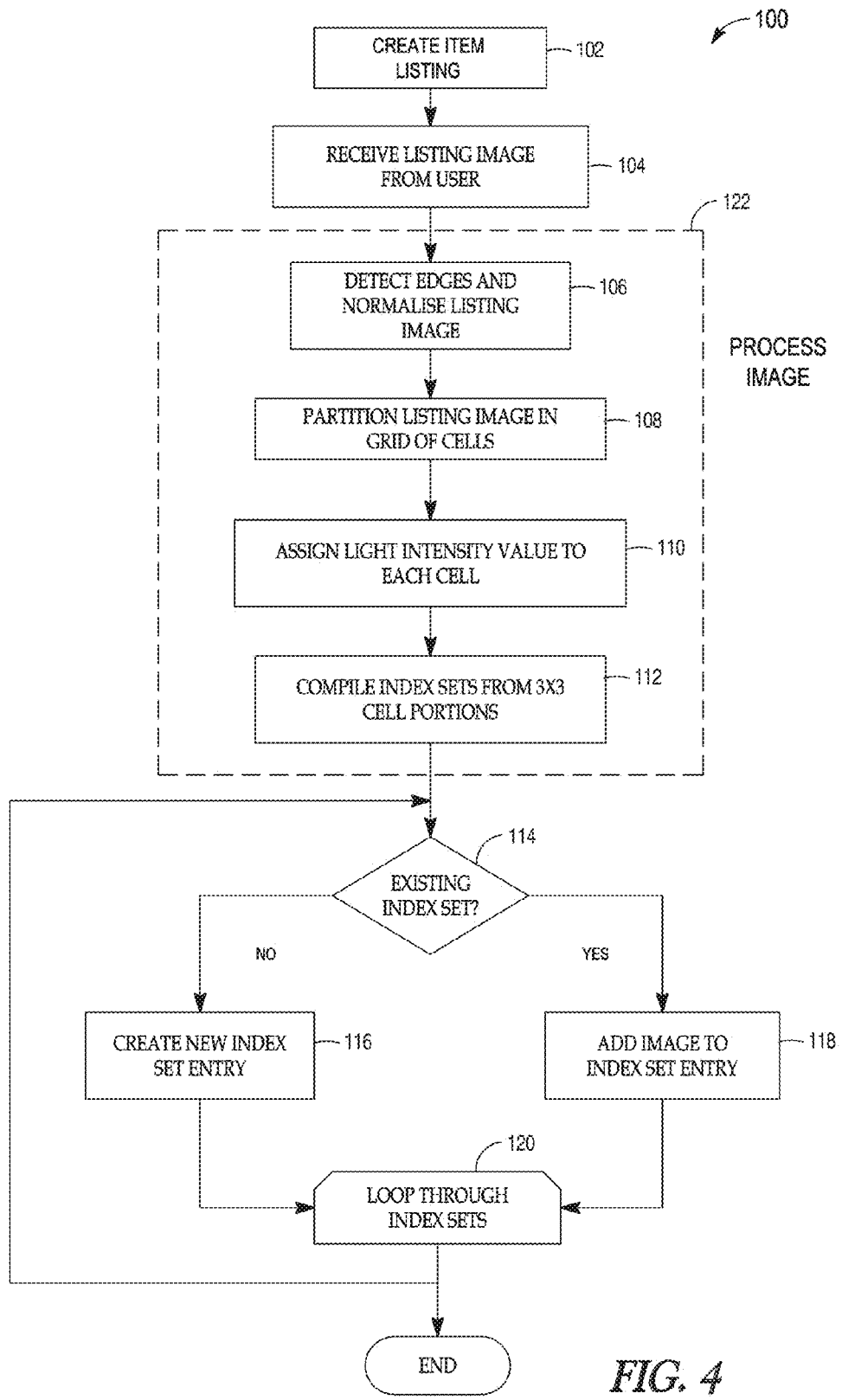
FIG. 4 is a flow chart illustrating an example method to index a listing image according to an example embodiment.

FIG. 4 is a flowchart showing a method 100 for processing an image in a network-based marketplace in accordance with an example embodiment. The method 100 starts with the creation of an item listing, at block 102, by a user via the listing creation application 60 (FIG. 2) in customary fashion. Creation of the item listing may include submission of an image related to the image, typically being an image of the item which is offered for sale or auction on the marketplace. The submitted image is received by the receiving module 80 at block 104.

The image may be an electronic image in standard file format, such as JPEG, which comprises a raster of pixels. Each pixel may have hue, saturation, and intensity values, in conventional fashion. It will be appreciated that images which were submitted earlier and which are stored in the image database 36, but which have not been indexed, may be provided to the processing module 86 by the database crawler 84 of FIG. 3, so that operation 102 in FIG. 4 may instead comprise submitting an un-indexed image from the image database 36 for processing.

Figure 6:
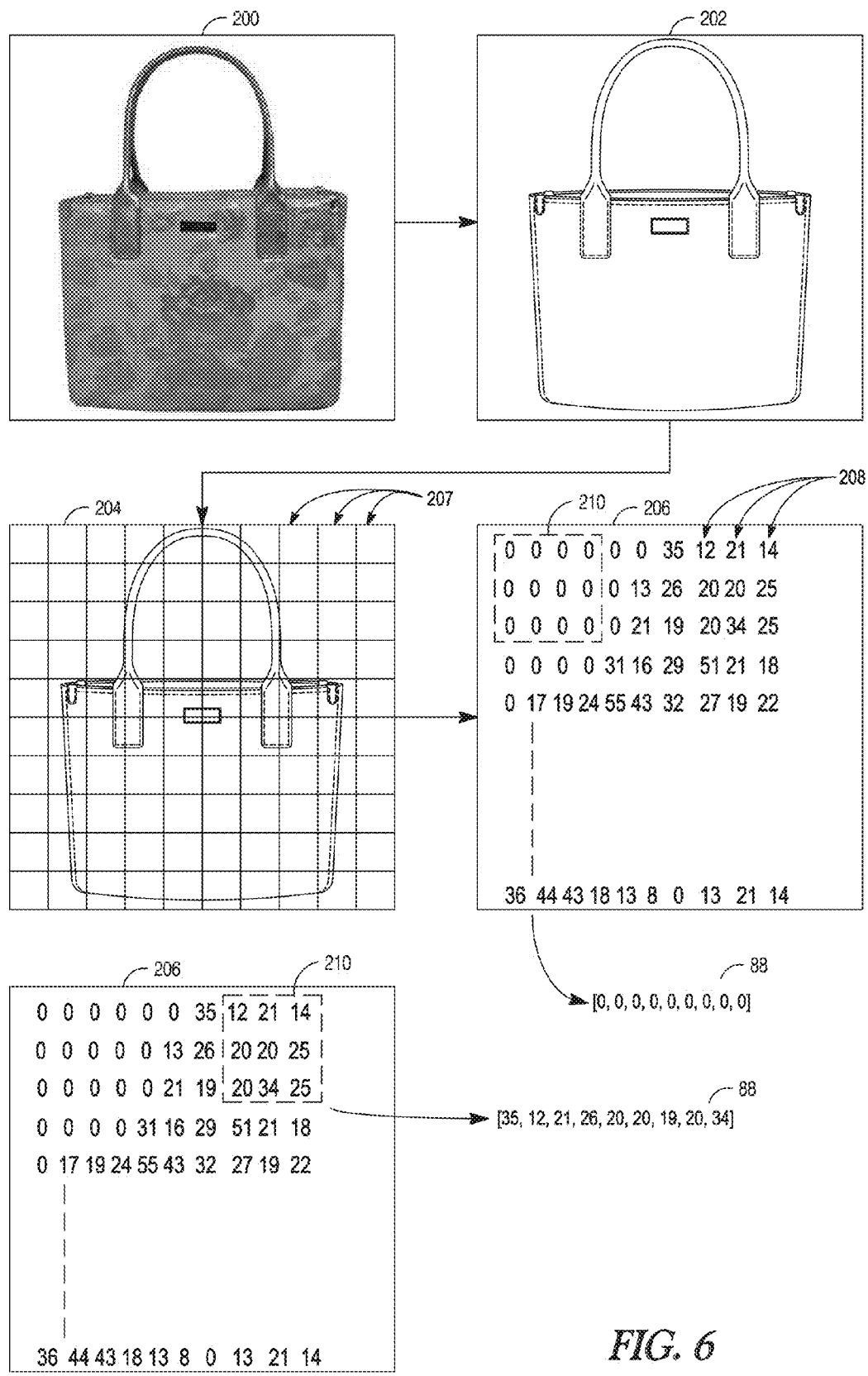
FIG. 6 is a schematic view of operations which may be performed on an image for indexing thereof according to an example embodiment.

The submitted image is then processed, at block 122, to generate index data for enabling index searching of database images. Processing of the image will be described with respect of an example image 200 illustrated in FIG. 6. First, an edge detection and normalisation operation is performed, at block 106, on the image 200, to produce a normalised edge image 202 (FIG. 6). Edge detection processing is well known in the art and any suitable edge detection algorithm may be employed in operation 106. Normalisation of the image includes desaturation, so that the normalised edge image 202 is a greyscale image. Normalization may further include contrast stretching or dynamic range expansion, to achieve consistency in intensity ranges for images processed by the processing module 86. Furthermore, normalization of the image may include re-alignment of the image 200 by automated correction of the image's orientation.

The normalised edge image 202 is then partitioned or divided, at block 108, into cells or sub-portions 207, to form a grid 204 (FIG. 6). In the example embodiment, the resolution of the grid 204 is ten by ten, so that the grid 204 comprises ten rows of ten sub-portions or cells 207 each. Because the size of each block or cell 207 is considerably larger than that of the image's pixels, each cell 207 comprises a plurality of pixels. It will be appreciated that the resolution of the grid may differ in other embodiments.

Thereafter, an index value 208 is assigned, at block 110, to each cell 207 based on an image attribute of the underlying image pixels of the cell 207. In this example, the image attribute is intensity, typically measured on a scale of 0 to 255, or alternatively 0 to 100, where a pixel having a zero intensity is white and a pixel having intensity value of 255 (or 100, as the case may be) is black. The index value 208 assigned to each cell 207 may thus be the average light intensity value of the pixels constituting each cell 207. The output of operation 110 is therefore a ten-by-ten grid 206 of index values 208 based on the intensity values of the respective cells 207 (FIG. 6). The grid 206 can be viewed as a two-dimensional histogram of the base image 200. It is to be appreciated that the particular index values 208 and the particular index sets 88 illustrated in FIGS. 3 and 6, and in other examples in this document, are chosen arbitrarily for illustrative purposes and do not accurately reflect the underlying intensity values of the illustrated images.

In other example embodiments, other image attributes can be used as well as or instead of the intensity value. For instance, colour values of the cells 207 may be calculated and indexed together with or instead of the intensity index values. An index value may for instance assigned to each cell 207 based on the average hue of the cell's pixels. Instead, separate grids may be produced for red, green, and blue colour spaces, and index values based on the intensity values of the respective colours in the cells may be assigned to the cells.

At block 112, feature vectors or index sets 88 are compiled from the grid 206. Compilation of the index sets 88 comprises iteratively isolating portions 210 of the grid 206 and listing the index values 208 in each portion 210 in sequence, to provide an index set 88. Compilation of the index sets 88 can thus be described as a sliding, overlapping mask or window 210 which is three-by-three index values in size, and which iteratively isolates all possible contiguous three-by-three selections in the grid 206, to generate respective index sets 88. Each index set 88 thus comprises a sequence or vector of nine index values 208. Although only two of these index sets 88 are shown in FIG. 6, it will be appreciated that the results of index set compilation for a ten-by-ten grid 206 will be 64 index sets.

The index sets 88 thus generated are incorporated in the index database 37. As explained above with reference to FIG. 3, the index database 37 comprises a single entry for each unique feature vector or index set 88, with all images which contain that index set 88 being listed in the entry. To this end, each index set 88 generated in operation 112 is processed by first establishing, at block 114, whether or not the index database 37 already includes an entry for that particular index set 88. If the determination at block 114 is in the affirmative, the image which is the subject of current processing is linked, at block 118, to the existing entry in the index database 37 by including the image filename in the listing of images in the respective database entry. If, however, the determination is in the negative and there is not yet a database entry for the index set 88 under consideration, a new index set entry is created, at block 116, in the index database 37. It will be appreciated that such a new database entry will have only the current image associated with the particular index set 88. This database writing sequence is looped, at block 120, through all of the index sets 88 generated at operation 112, therefore being performed 64 times in the example embodiment having a ten-by-ten grid 206.

Figure 5:
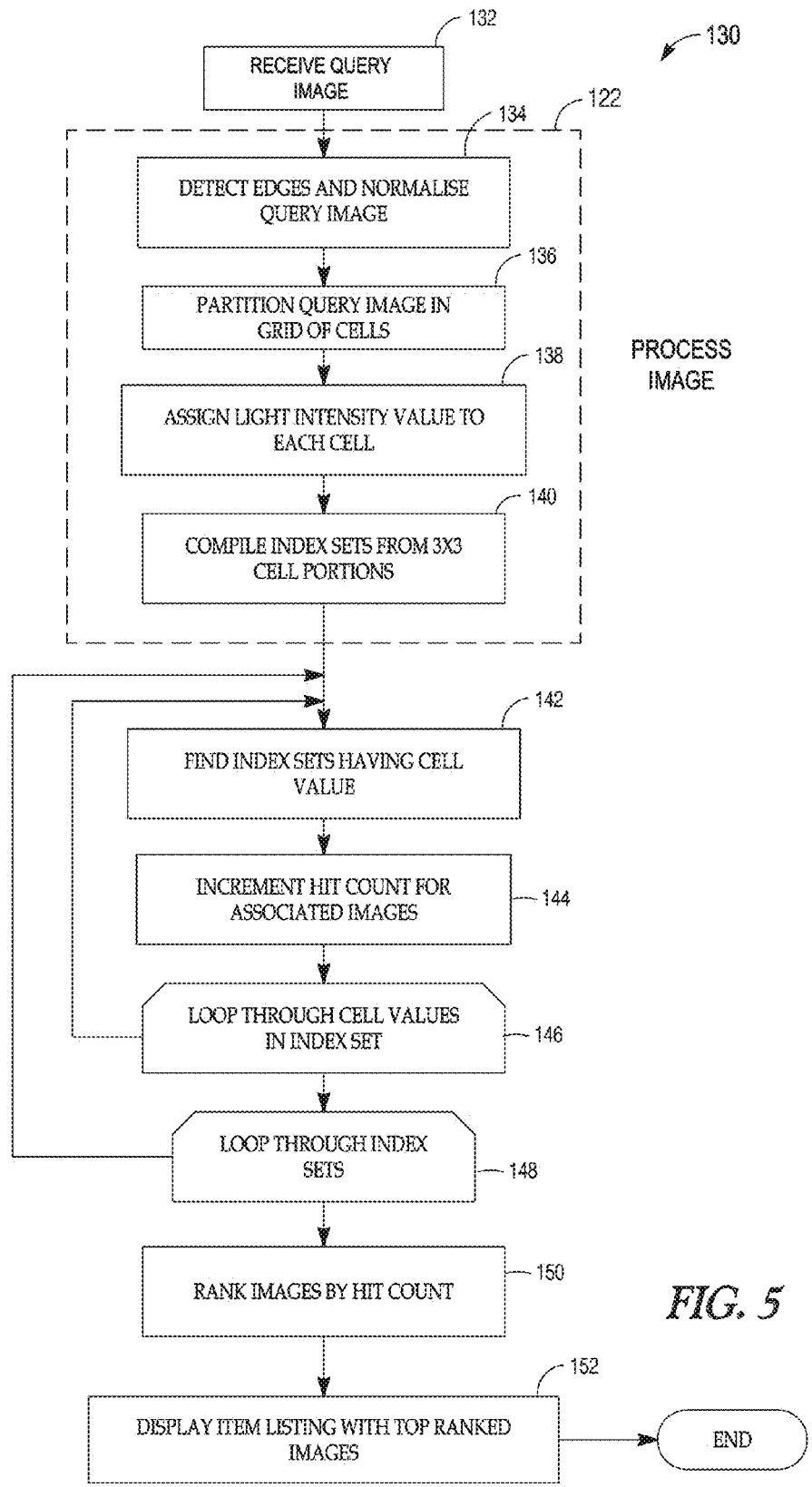
FIG. 5 is a flow chart illustrating an example method to perform an image-based search in the example embodiment of FIG. 1.

FIG. 5 is flowchart of a method 130 of image-based searching in accordance with an example embodiment. The method 130 is initiated by user submission of a query, at block 132, via the image search application 59 of FIG. 2, and includes a query image on which the search is to be based. The query image is again a digital image in a standard file format. A user wishing, for instance, to search for item listings in respect of a particular device may photograph the target device, for example by use of a mobile phone with image capturing capabilities, and may submit the image to the image search application instead of or in addition to entering text in the keyword search application 57. A search for listing images that are in database 37 may be made, based on the query image, and a set of images similar to the query image is returned.

The query image is processed, at block 122, by the processing module 86 to generate index sets 88 for the query image in a manner identical to indexing of images in accordance with the method 100 of FIG. 5. Edge detection and normalisation of the image is thus performed, at block 134, whereafter the query image is partitioned in a grid of cells 207, at block 136. Then, index values 208 are assigned to each cell 207 based on the intensity values of the underlying pixels of the cell 207, and index sets 88 are compiled by use of the sliding, overlapping window 210 method described above.

After generation of the query index sets 88 from the query image, the query feature vectors or index sets 88 are compared to the index data in the index database 37 to identify images similar or identical to the query image. To this end, the comparison module 90 processes each of the query index sets 88 in turn. The comparison module 90 steps or loops, at block 146, through the index values 208 of a particular index set 88 to find, at block 142, all index set entries in the index database 37 that share that index value 208. For each index entry identified as sharing the particular index value 208 under consideration, a hit count is incremented for each of the images associated in the index database 37 with the identified database entry. The database images are then ranked in descending order according to hit count.

In an example where the first query index set 88 is [24, 12, 13, . . . , 4], the first index value 208 is 24. If the index database 37 includes the following entries:

1. [0, 0, 24, 16, 26, . . . ]=IMG#221, IMG#3224, IMG#6739
2. [36, 48, 18, . . . ]=IMG#644, IMG#2542
3. [24, 12, 0, 0, . . . ]=IMG#3224, IMG#2143, the first iteration of operation 142, in respect of value 24, will result in an increment in the hit count of the images in data entries 1 and 3 above. The second iteration of operation 142, which will be in respect of value 12, will result in the incrementing, at block 144, of the images in data entry 3 above. The results of looping through all the index values 208 of query index set 88 shown above will be IMG#3224=3 hits; IMG#2143=2 hits, with the remainder of the listed images registering a single hit, apart from IMG#644 and IMG#2542 which will have no hits registered against them.

After repeating operations 142 to 146 for all of the index values 208 of one of the index sets 88, the process loops, at block 148, to the next query index set 88. Operations 142 to 148 are thus repeated until all of the index values of all of the query index sets 88 have been compared to the index database entries, the hit counts being aggregated to provide a ranking of images by hit count, at block 150.

In other embodiments, the comparison of index sets may include comparing all of the index values of query index sets with all of the values in the respective pre-compiled index sets forming database entries in the index database 37, to that a hit is registered only if there is complete overlap between the index values of, on the one hand, the query index set, and, on the other hand, the index values of the particular database entry. In yet further embodiments, the comparison of feature vectors or index sets may include matching not only the values of the query index sets to database entry index sets, but also matching the sequence of index values in the respective index sets. A hit will thus be registered only if the query index set matches a database entry's feature vector or index set 88 exactly, in other words if both the values and the sequence of the respective index sets are identical. To promote processing speed and efficiency when performing exact feature vector or index set matching, the index value range may be reduced in scale, so that the index values, for example, range in value from 0 to 10 instead of, for example, from 0 to 100.

Instead, or in addition, the comparison operation may include a weighting of the hit count based on the position of the respective index sets in the image. In other words, hits may be assigned weights based on adjacency of the index sets in the image. Two matching index sets which were compiled from image portions or windows which are in adjacent or identical locations in the grid may therefore result in a higher weighted hit, while a lower weighted hit may be registered if the respective image portions or windows are less adjacent.

As mentioned above, pre-complied feature vectors or index sets 88 may be stored in the index database in a data structure like a k-dimensional tree, also known as a k-d tree. Comparison of a query index set or feature vector may in such cases comprise performing a nearest neighbour search in the k-dimensional tree.

The hit counts of the images are passed by the comparison module 90 to the result module 92. The result module 92 then displays to the user, at block 152, the results of the search. The search results are provided as a list of item listings extracted from the item listing database 35, the displayed item listing being the item listings linked to the top ranked images, as identified by the comparison module 90.

The system 10 and methods 100, 130 described above provides for effective image-based searching in the network-based marketplace. Indexing of the images in the image database 36 in accordance with the described example embodiment permits similarity comparison of the query image with large numbers of database images without requiring prohibitive processing power or time.

In addition to use of the indexing method 100 for user-initiated image-based searching of the database 36, it may, in other embodiments, be used for fraud prevention applications in the network-based marketplace. In such embodiments, the fraud prevention application 68, shown in FIG. 2, may be provided with a query image representing an article which may be susceptible to fraud. Image comparison as described above with reference to FIG. 5 may then automatically be performed in response to the creation of new listings, so as to flag new item listings having images with a similarity rating or weighting, as determined by index data comparison, higher than a set threshold value.

In other embodiments, the processing operation 122 to generate index sets 88 may differ in a number of aspects, some of which are described with reference to FIGS. 7-9. In one embodiment, illustrated in FIG. 7, the indexing method 100 includes producing a number of variations of a subject image 200, and processing each of the variations to produce a plurality of index sets 88 for each of the variations. In other words, a single base image 200 is used to produce multiple image variations, and each of the image variations is indexed and its index data is recorded in the index database as separate images, each of which is linked to a common item listing. Identification of any one of these image variations ranking images by hit count, at block 150 in FIG. 5, will result in the associated item listing being presented in results of an image-based query.

In another embodiment, such image variation may be performed upon searching instead of, or in addition to, image variation during indexing. In such case, a query image may thus be processed to produce multiple image variations, index sets 88 thereafter being generated for each of the variations and being compared to the index database 37.

Figure 7:
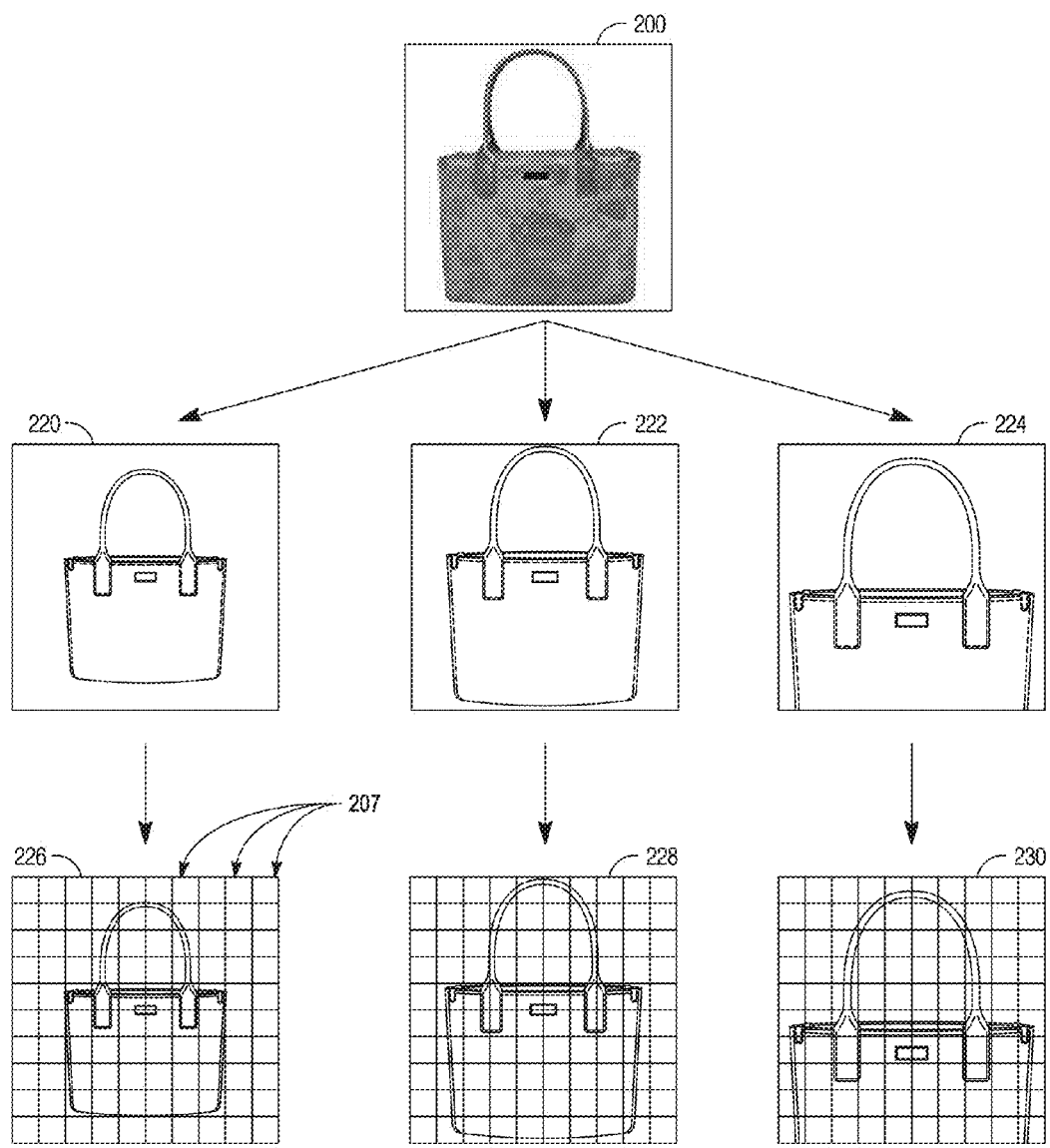
FIG. 7 is a schematic view of operations which may be performed on an image for indexing thereof according to another example embodiment.

In the embodiment illustrated in FIG. 7, the subject image is cropped at three different magnification levels to produce three edge image variations 220 to 224. Each of these edge image variations 220 to 224 are then partitioned into sub-portions 207 to provide respective grids 226 to 230. Although not illustrated explicitly in FIG. 7, the grids 226 to 230 are then assigned index values 208, and index sets 88 are compiled as described with reference to FIGS. 4 and 6. It will be appreciated that the number of magnification levels, and therefore the number of image variations 220 to 224 can be varied. In one embodiment, which is not illustrated, ten image variations based on varying cropping magnifications may be produced.

Figure 9:
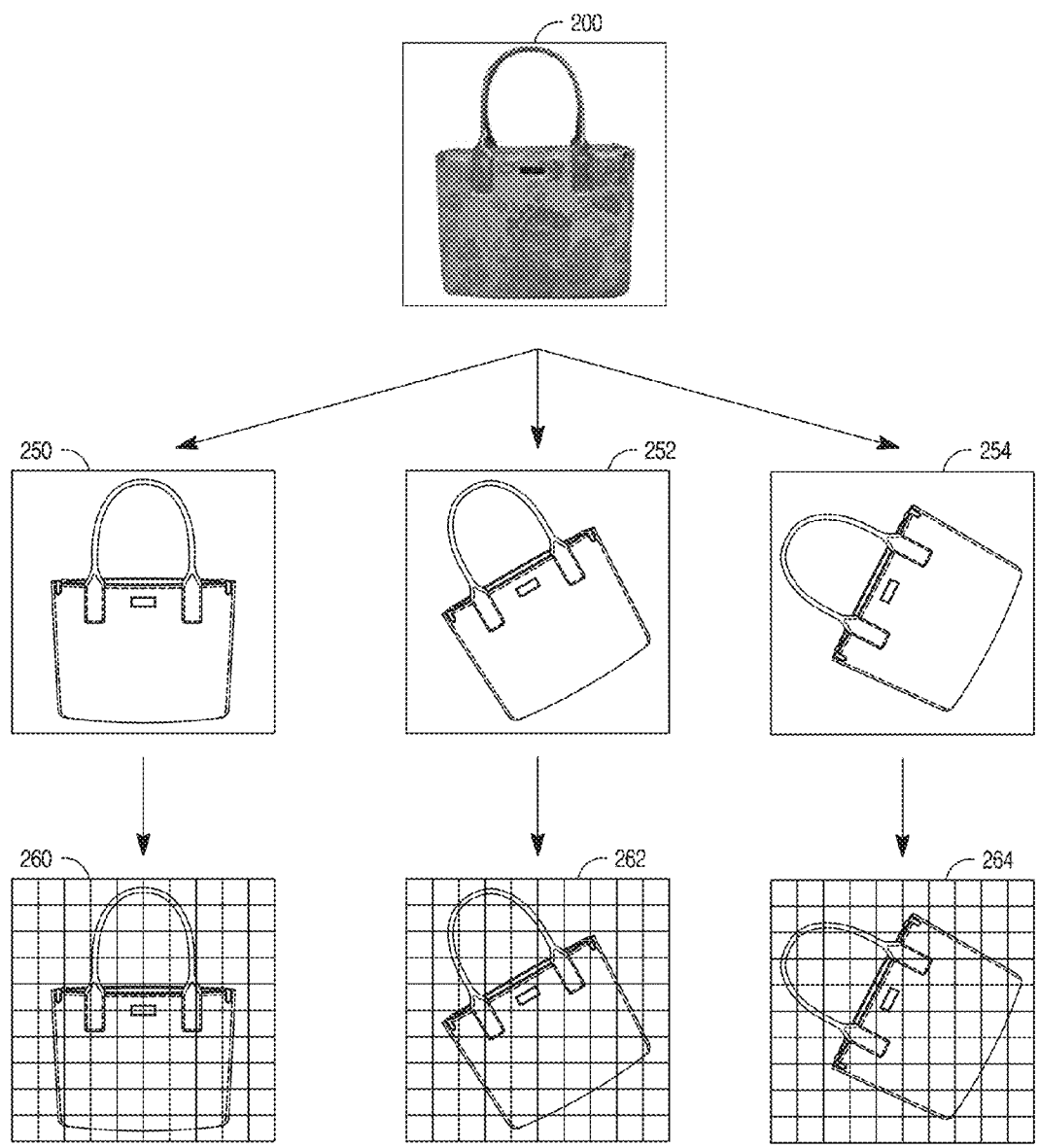
FIG. 9 is a schematic of operations which may be performed on an image for indexing thereof according to yet a further example embodiment.

In another embodiment, illustrated in FIG. 9, the subject image 200 is rotated or angularly displaced at three different angles to produce three edge image variations 250 to 254. These edge image variations 250 to 254 are then partitioned into grids 260 to 264 for further processing to generate respective collections of index sets 88.

Figure 8:
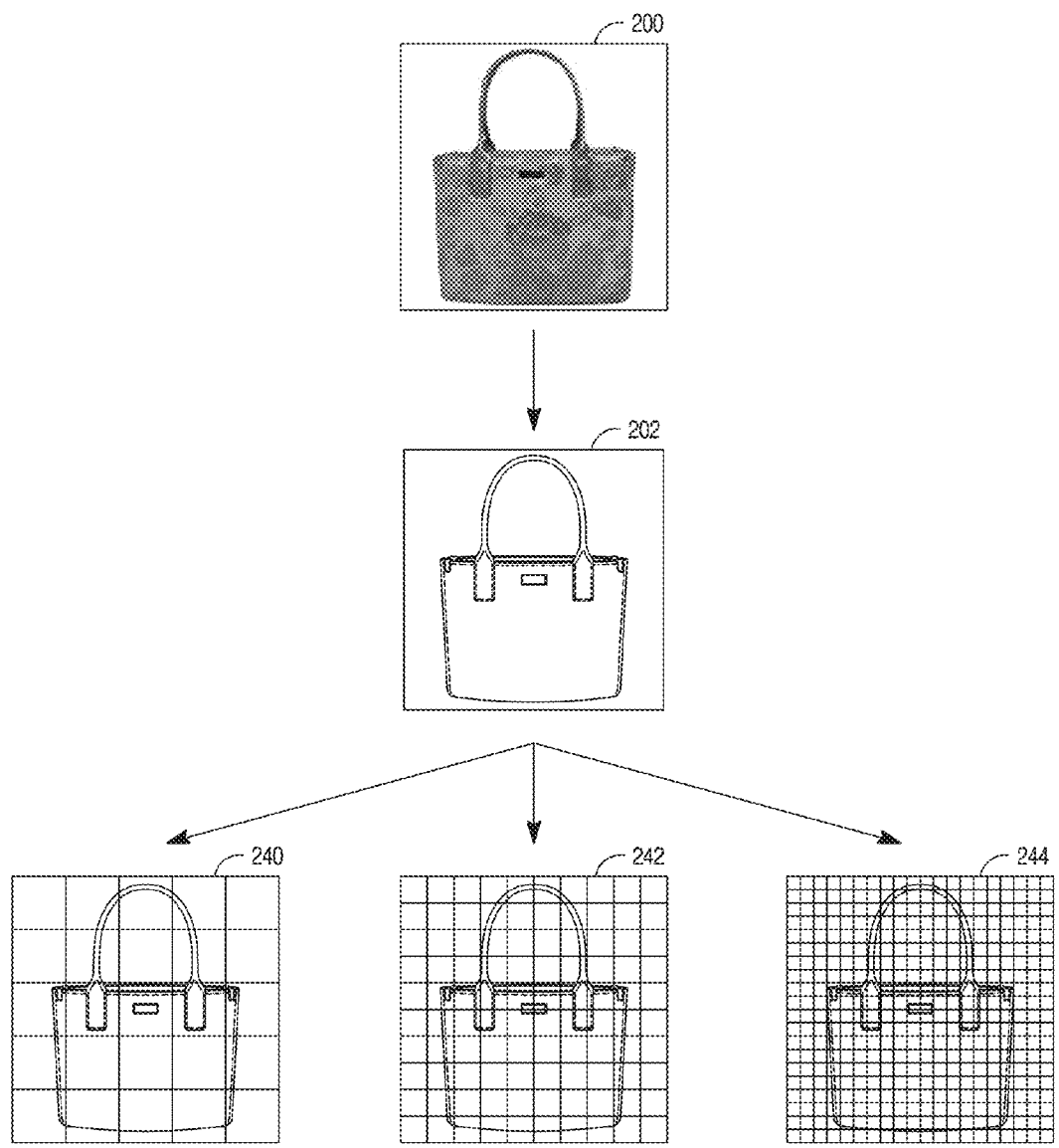
FIG. 8 is a schematic of operations which may be performed on an image for indexing thereof according to yet another example embodiment.

In yet another embodiment, illustrated in FIG. 8, the subject image is first subjected to edge detection and normalisation, to produce a normalised edge image 202. Thereafter, the normalised edge image 202 is partitioned at three different grid resolutions. In the example embodiment, the image 202 is partitioned at a 5×5 resolution to produce a first grid 240; it is partitioned at a 10×10 resolution to produce a second grid 242; and it is partitioned at a 20×20 resolution to produce a third grid 244. Each of these grids is further processed to produce respective collections of index sets 88, and each of the variations 240-244 may be recorded in the index database 37. It will be appreciated that each of the variations is linked to the common image listing, so that identification of any of the variations 240 to 244 in an image-based search will result in return of an item listing associated with the subject image 200.

In another embodiment, the partitioning resolution for indexing may be determined by a category of the relevant item listing. For example, the method may include categorising an item listing upon creation, determining the item listing's category before processing the image, at block 108, and selecting the partitioning resolution based on the item listing category. For instance, apparel may be partitioned at a 10×10 resolution, while electronic devices may be partitioned at a 15×15 resolution.

It will further be appreciated that the system and methodology described above can be applied to video content as well as or instead of image data. The method may in such case include extracting images from video files, and processing the extracted images in accordance with the example embodiments described herein. Image extraction from such video content may include automatically identifying scene changes in the video content, e.g. by comparison of successive frames or images in the video content, and extracting images or frames at the start of such scene changes.

The example embodiments described herein address some of the technical challenges associated with effective processing of images linked to item listings. For instance, image databases of network-based marketplaces are often very large, comprising millions of images, so that the time and/or processing power consumed by conducting a search or image comparison in the database is prohibitive. However, a comparison of index data generated for the query image with index data of database images is considerably less resource intensive.

In another example embodiment, there is provided a system and a method to index images associated with item listings in a network-based marketplace, so that subsequent similarity search or comparison operations are performed on index data instead of on base images stored in an image database. Images in the image database are thus indexed by parsing or processing the images for feature extraction. The feature extraction may include generating multiple sets of index values associated with each image. Each set of index values is also referred to as a feature vector or an image fingerprint.

Digests for various image features can be pre-computed and stored in the image database for subsequent recall, as a recall set, for comparison to a query for an item, for example, at run time. As examples, a digest can include edge information as alluded to above, color information, pattern, quality, texture, and the like. Digests can also include textual information as well as image information such as item attributes that are either determined by the system at the time of listing, or are specified by the seller. However, here "textual" does not mean merely words typed by the user. "Textual" means text information to be stored about the item the seller is listing, including item title, and also attributes of the item. This can be considered "structured" and "unstructured" item data. For example, unstructured data may include item title and item description, which may comprise whatever data the seller wants to include. Structured data may be data such as the item category (e.g., shoes, handbags, and the like) and item aspects such as brand, material, and the like, where each piece of information can be stored as separate name-value pairs. For example, if the listing item is a Coach handbag with title "New brown Coach purse", the digest may include the following terms as textual elements of a pre-computed digest (new, brown, Coach, purse, Brand: Coach, Material: leather, Style: satchel).

As an example of an edge part of a digest, the image can be converted into a grid as discussed in detail below, where each box in the grid contains a value indicating the presence of a signal, such as a pixel, which, when integrated across all grids of interest, indicate a strong edge in that region of the image. The edge digest is stored as a string of buckets representing each element in a matrix. This is discussed in more detail below.

Color Detection

Figure 10A:
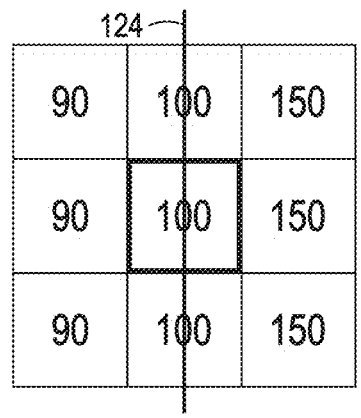
FIG. 10A is grid of pixels useful in illustrating a color method in pre-computing digests.

In performing a color process, it is desirable in pre-computing digests, or for building a recall set for comparison with a query, to determine whether a first pixel in a number of pixels bears a positive likeness to a second pixel or a negative likeness to the second pixel. This can be seen in FIG. 10A which depicts a grid of nine pixels, similar to portion 210 on FIG. 6. A central pixel 124 can be used as a reference pixel. Neighbouring pixels are evaluated for gradient detection of the neighbouring pixels. If the pixels of FIG. 10A exhibit the gradient values indicated, it is seen that the values are changing rapidly between 100, 100, 100, and 150, 150, 150, so, for this example, a vertical line can be placed as indicated in FIG. 10A, illustrating basic gradient detection. This grid computation can be done by processing module 86 for each pixel in the image, the type of line referenced above being placed at or near rapid change of values for each grid.

Figure 10B:
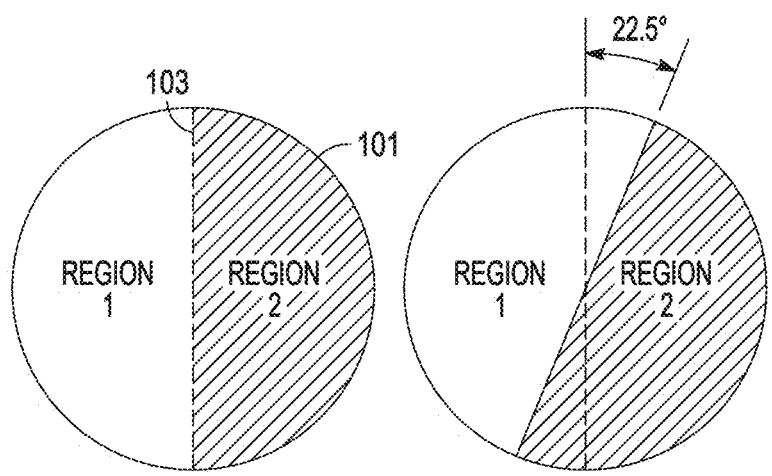
FIG. 10B is an illustration of a method of using greyscale histograms for gradient detection.

A more refined process of gradient detection for an image is illustrated in FIGS. 10B and 11. Referring to FIG. 11 in more detail, segmentation and background extraction is performed on an image such as image 111. Image 111, also referred to as a source image, may be an image, such as a photograph, of an item that is to be offered for sale on a network-based marketplace. A digest can be pre-computed for the image 111, and used for subsequent similarity searching, as alluded to above. In order to find the various regions of change of signal, such as a pixel, of the image 111, refined gradient detection can be employed, as seen in FIG. 10B, using, for example, a circle 101 that is bisected along eight different diameter lines giving what can be viewed of eight windows of computation. Each of the windows divides the circle 101 in half, creating what is shown here as Region 1 and Region 2, along lines of different angles (each 22.5 degrees apart, in one example). The distance between the greyscale histograms of the pixels that lie beneath the two regions (the two halves of the circle 101, Region 1 and Region 2) is computed using an algorithm. Stated another way, the difference in intensity of blackness versus whiteness of Region 1 versus Region 2 can be computed and a number is assigned to the result of that computation. The diameter of the circle 101 can then be rotated, eight rotations of 22.5 degrees, and the distance between the greyscale histogram of the pixels that lie between the two halves of the circle 101, Region 1 and Region 2, of FIG. 10B is again computed. The diameter of the circle 101 can be rotated another 22.5 degrees and the distance recomputed. This is repeated until the diameter has been rotated 180 degrees and the maximum distance has been computed at each point.

Returning to FIG. 11, the maximum difference of all of the above eight angles of the diameter can be computed for each pixel and that value can be used in a resulting matrix for the image 111. The areas of blackness are where there is substantially no change, whereas at edges of an image there is a major gradient difference. This matrix is sometimes called the gradient matrix. While an example using specific diameter rotations (e.g., 22.5 degrees and 180 degrees of rotation) has been given with respect to FIG. 10B, it is recognized that other angular rotations, and total degrees of rotation, can be used to obtain the same or similar result.

Figure 11A:
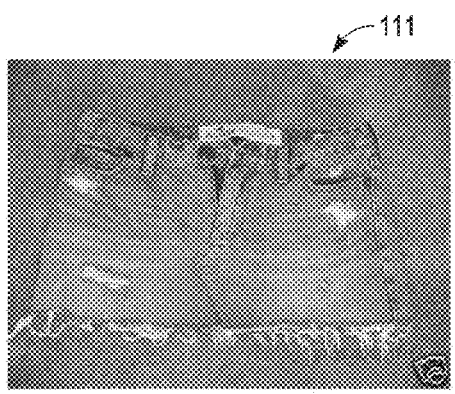
FIG. 11A to 11D is an illustration of segmentation and background extraction from a color source image.
Figure 11B:
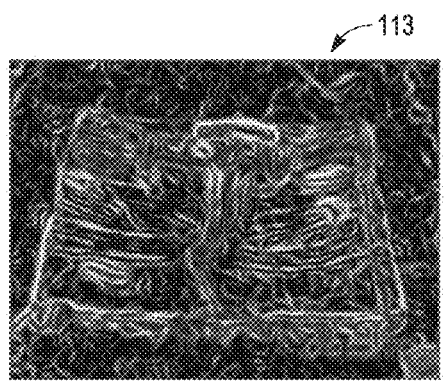

Edges of the image 111 can be found by a technique called water shedding. In a recomposing process, each area of an image is filled with color. This can be visualized generally as if the image were a terrain map and as if the color were water. The points of a watershed image 113 of FIG. 11B where the colors begin to meet create boundaries to differentiate object from background. This is sometimes called "computing the watershed" from the gradient matrix. An analogy for computing the watershed is to picture the above gradient matrix as a three-dimensional landscape. The watershed analogy begins by flooding the landscape starting at a zero gradient level and working up to the maximum gradient level. At each level, some segments, or regions (of water, in the analogy), will grow and new segments, or regions (of water, in the analogy) will form. Each of these segments will remain a separate segment. Where two separate segments join, a line can be drawn. These lines comprise the watershed image 113 that is seen in FIG. 11B. This can be done in each segment of the watershed image 113.

Figure 11C:
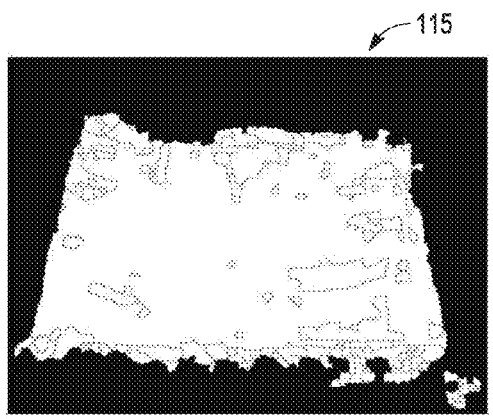
Figure 11D:
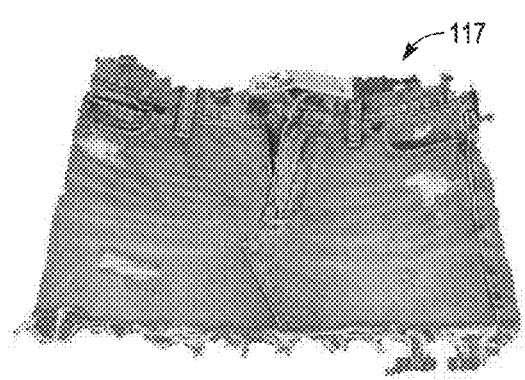

Next, a segment graph 115 is created from the watershed image 113 as shown in FIG. 11C. Small segments are joined to a most-similar neighbor. Very similar adjacent segments are also joined. Then, border segments are marked as part of the background unless an average pixel is in the middle third or most of the segment's pixels are in the middle third. The background is zeroed out from the original image, and a hue histogram is calculated to generate a compressed color representation 117 for the image as shown in FIG. 11D.

Figure 12B:
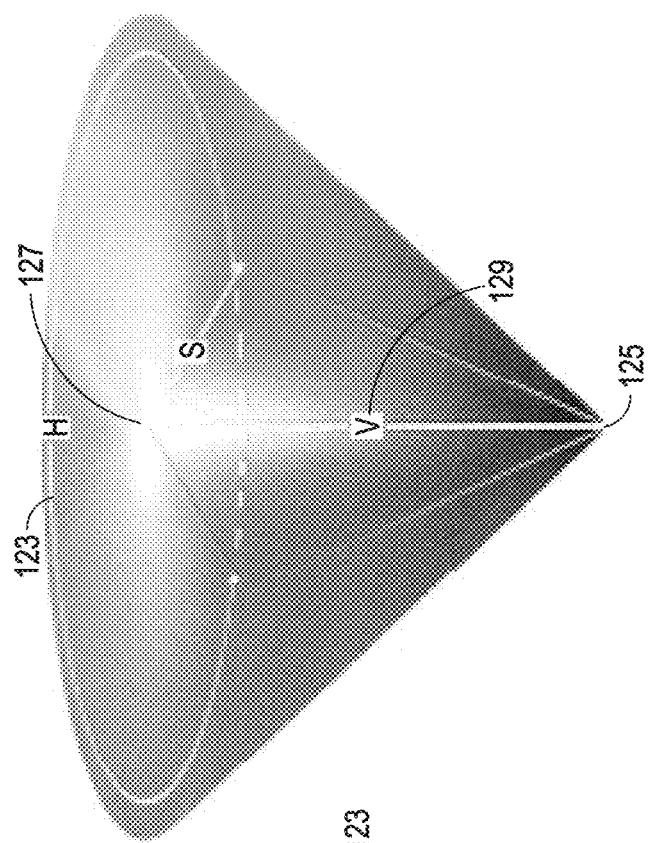
FIG. 12B is an isometric view of an HLS cone.
Figure 12A:
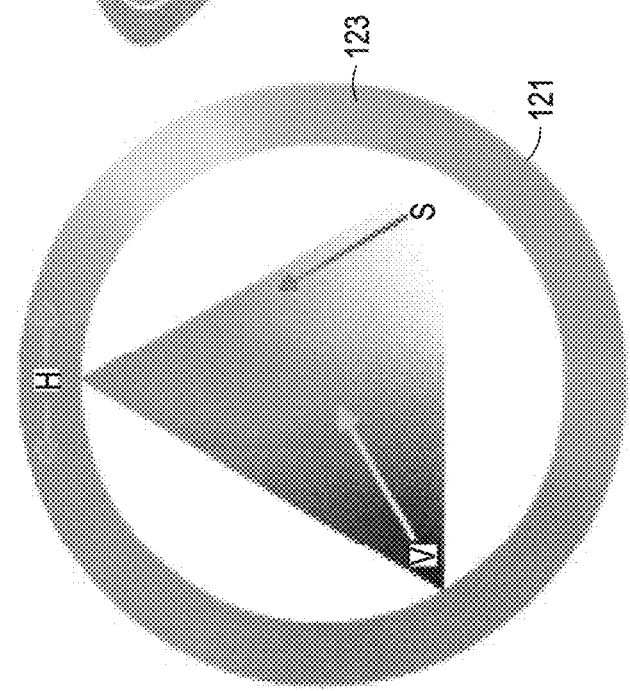
FIG. 12A is a top view of an HLS cone.

As discussed previously, the color representation 117 of the image may be accomplished with hue level color bucketing using an HLS cone. An HLS cone is illustrated in FIGS. 12A and 12B. FIG. 12A depicts a top view of the HLS cone, and FIG. 12B depicts an isometric view of the cone. Hue H can be viewed as being represented on a circumference 123 of a hue circle 121 at a depth, and in the visual spectrum red, orange, yellow, green, blue, indigo, and violet. On vertical axis V of FIG. 12B, luminosity is increasing upwardly with distance. The saturation S increases outwardly with the radius. In example embodiments, hue level bucketing is based on the following heuristics:

A bottom region 125 of the cone is black.

At the top level of the cone, a center region 127 of the circle 121 is white.

A middle region 129 of the cone is grey.

On the rest of the image, the outer edge of the circumference 123 is divided into sixteen colour buckets.

For each image, such as the image 111 of FIG. 11, there are buckets for each count of pixels in regions for (black), (grey), (white), and 16 buckets corresponding to (hue) (luminosity) (saturation) as discussed above. That is, for the color part of a digest, pixels of various hues of a color can be mapped into a single, discrete color bucket based on their hue. For example, various gradations of red pixels may be mapped to the "red" hue bucket, and so on for pixels of the various colors. This may be a color histogram which can be, as in one example, a string of fifty-one (51) bytes that has the form: (black), (white), (grey), (hue1), (lightness1), (saturation 1), (hue2), (lightness2), (saturation 2), . . . (hue16), (lightness 16), (saturation 16).

If the histograms are looked upon as vectors, the standard Euclidian distance between the two vectors could be calculated. Unfortunately, this may yield an unreal effect because Euclidian distance indicates that each color bucket is weighed the same. That is, red is just as similar to orange in Euclidian distance as red is to purple, or as red is to green, or as red is to black. But human perception does not operate in that manner; color lies on a spectrum (red, orange, yellow, green, blue, indigo, and violet) in human vision such that red is closer to orange and yellow than red is to green, for example. Therefore, the color buckets may be weighted by the distance from each other as well. As such, the color buckets can be organized linearly around the circumference 123 of hue circle 121, as seen in FIG. 12A. The color buckets are in order such that red, orange, yellow, and green match the color wheel. Therefore, if a first color bucket is next to a second color bucket, then the first color has some visual-perceptual similarity to the second color.

The color similarity assumes a fixed distance between black, grey, and white (four units) and a distance between each color bucket is a unit distance in the circular scale at the circumference 123. Stated another way, the circular hue space shown in FIGS. 12A and 12B is divided equally and discretely into 16 regions, or "color buckets." Three more buckets can be added representing white, grey, and black. For each of these 19 buckets, three (3) values are computed: the count of pixels falling in the bucket, the average luminosity of those pixels, and the average saturation of those pixels. The distance between any two color buckets includes the number of "steps" separating them around the partitioned hue circle 121. Thus, for example, if the "red" bucket is adjacent to the "orange" bucket, the distance between them is one unit. For black, grey, and white buckets, the distance to any other bucket may be fixed at four units. Taking into account the distance between color buckets resolves the above human perception problems encountered when using only Euclidian distance.

The process of taking into account the distance between color buckets provides an improvement when two histograms are compared to determine how far these histograms are from each other. That is, this process enables the system to determine how much visual difference obtains between two different histograms. In the comparison of histogram vectors, the color buckets are weighted by the distance between them by providing, in the similarity comparison, that if a given color bucket is next to another given color bucket, as in FIGS. 12A and 12B, the two colors represented by the color buckets have similarity to each other.

Texture Detection

Figure 13:
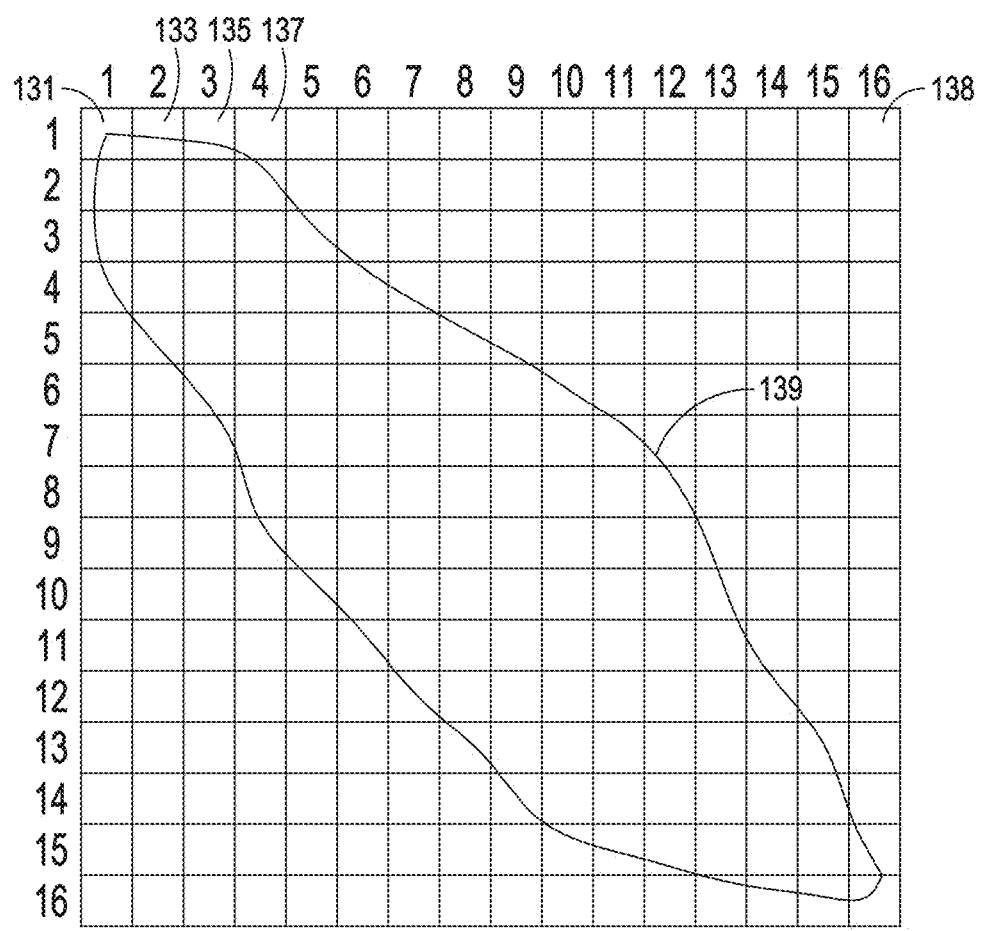
FIG. 13 is a sixteen-color grey matrix useful in texture detection.

Texture detection can be performed by the system using grey level co-occurrence analysis. The system can convert an image to a grey scale, for example, a 16-color grey matrix, numbered one through sixteen on each coordinate, as illustrated in FIG. 13. The system can detect each pixel of the image, examine neighbouring pixels surrounding each pixel, and count the occurrence of two pixels coming together. As an example, and with continued reference to FIG. 13, box 131 represents one pixel, grey value one, occurring next to another pixel having grey value one. The system counts how many times in an image grey value one (e.g., a light grey) occurs next to the exact same color grey (e.g., grey value one). The same process may be performed for grey value two at box 133, grey value three at box 135, grey value four at box 137, . . . , grey value 16 at box 139. The matrix is filled out to get the color co-occurrence of the greys. Then, the matrix is transformed. This process can be implemented in the pre-computing of digests, and also may be done on the query at the time of the query request so that the query request can be compared to the digests in the image digests in the index database 37. However, a pixel of one color is likely to occur next to a pixel of the same color, because colors tend to come in blocks of shade. That being the case, the matrix tends to include data that is bunched as at box 139 of FIG. 13. Without additional scaling, this is not significantly useful data because the matrix provides information that is primarily that the grey is co-occurrent, which is already known information. Without further adapting, the matrices do not allow meaningful differentiation of one image from another. The result would be that each pixel seems very similar to others. However, the system can scale up the matrices (e.g., one in pre-computing digests and one in calculation on the query image) so that the system scales up the values in the corners of the matrices (e.g., one of the matrices illustrated in FIG. 13), corner values being the key values for determining texture. Stated another way, transformation emphasizes the areas of an image that change rather than the areas of an image that remain the same, which emphasis makes the texture in an image stand out. The edges of an image tend to contain the most relevant texture data.

The above matrix (for the pre-computed digest and also for the query image at run time) can be transformed to emphasize high contrast data, by the following example equation:

$$n_{x,y} = m_{x,y}((|x-y|)+1)^2$$

Where: $m_{x,y}$ is the value in the original matrix at position (x,y); and x and y represent grey values.

So, referring again to FIG. 13, at box 131, the coordinates of which are one, one, nothing happens to box 131 because one minus one is zero, and so on.

Rotation Normalization

Figure 14A:
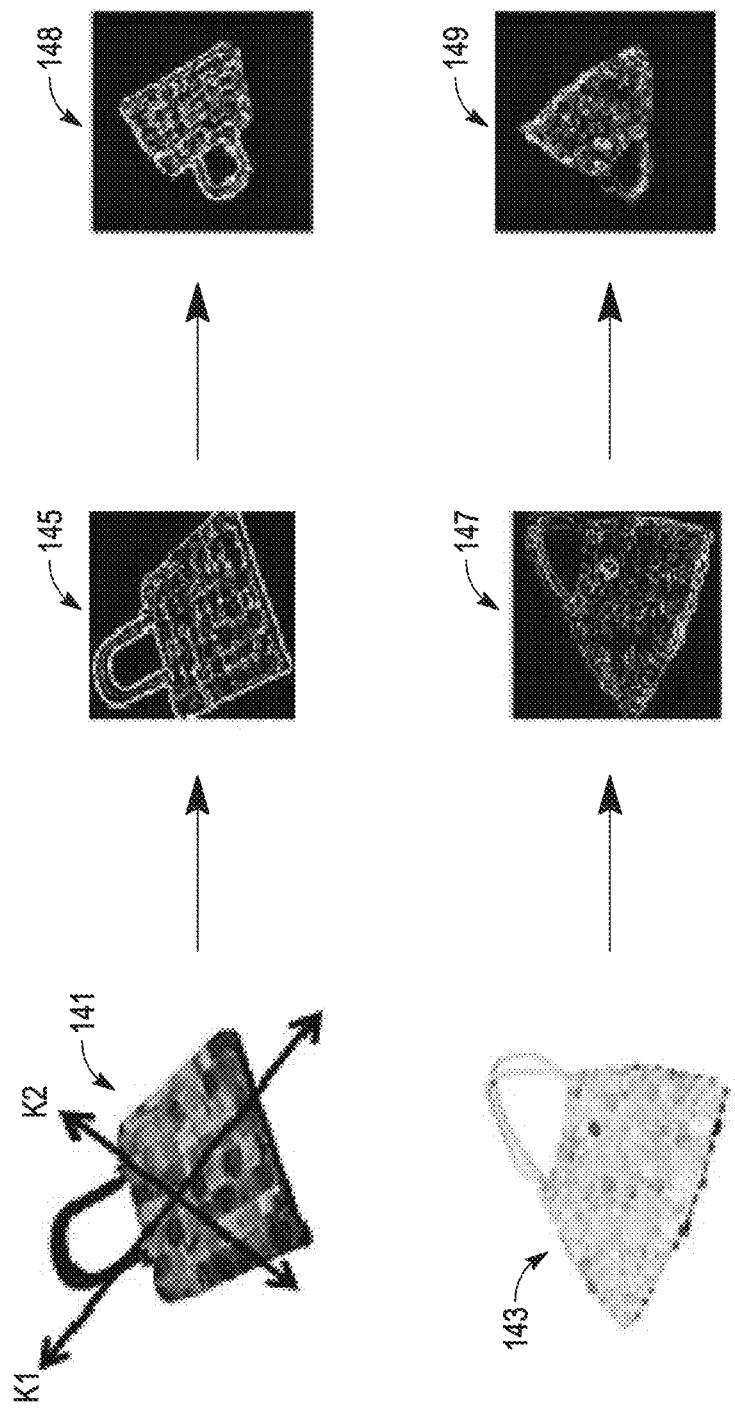
FIG. 14A is an illustration of rotation normalization useful in pre-computing digests.

As mentioned previously, when comparing two images, such as a query input from the user interface and digests from the index database 37, the two images are compared by taking edge information, placing one image over the other, and determining the differences in the images, as discussed above. However, the process may not be robust for rotation. For example, and with reference to FIG. 14A, the two images 141, 143 are seen to be at two different orientations. This may be due to the fact that the user taking a photograph of the item depicted in image 143 for the query images is under no restriction as to what orientation of the item to use in the photograph. If the system were to then place the images 141 and 143 one over the other, the difference would be too great for meaningful computation for similarity and difference determination. That being the case, the system may rotate at least one of the images 141 and 143 so that both images 141 and 143 have the same angular alignment. The computation including placing one image over the other to determine similarity and differences can then proceed.

This rotation can be accomplished by using principal component analysis (PCA). PCA is a mathematical procedure that uses an orthogonal transformation to convert a set of observations of possibly correlated variables into a set of values of uncorrelated variables called principal components. The number of principal components is less than or equal to the number of original variables. This transformation is defined in such a way that the first principal component has as high a variance as possible (e.g., accounts for as much of the variability in the data as possible), and each succeeding component in turn has the highest variance possible under the constraint that it be orthogonal to (e.g., uncorrelated with) the preceding components. Principal components are guaranteed to be independent only if the data set is jointly normally distributed. PCA is sensitive to the relative scaling of the original variables. However, in this instance, PCA is used to determine an angle or a direction in which the images are each spread out the most so that similar objects have similar alignments. This method can be performed by finding the two major Eigen vectors of each edge detected of images 145 and 147, one the listing at digest creation time, and the other the query image at runtime. Then the system aligns one of the major Eigen vectors, for example the first major Eigen vector, K1 in FIG. 14A, to the x-axis. The system can do this for each of two images (e.g., a listing image 148 at digest creation time and a query image 149 at runtime), so that each image 148 and 149 then becomes aligned in the same direction for comparison.

Translation Normalization

Figure 14B:
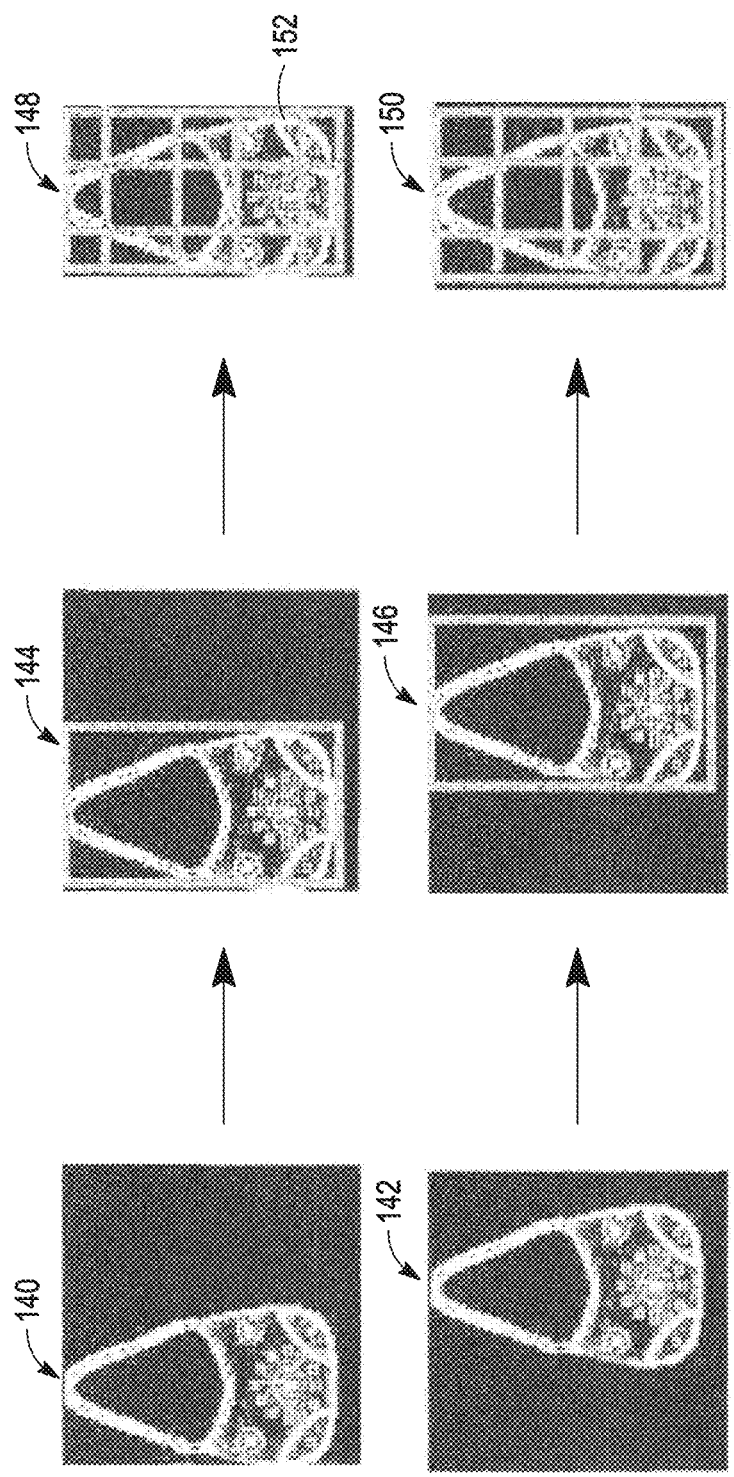
FIG. 14B is an illustration of translation normalization useful in pre-computing digests.

In addition, image features for shape may not be translation invariant. For example, a similarity measure for an image 140 in FIG. 14B, and a similar sub-image 142 which is simply shifted from image 140, would be very low. To solve this matter, the system takes the gradient of the edge detected image as previously discussed, and constructs a box, sometimes referred to as a "bounding box," around the foreground object. A bounding box for a point set in N dimensions is the box with the smallest area (or volume or hypervolume in higher dimensions) within which all the points lay. The bounding box can be on a fixed threshold, although a dynamic threshold could be used as well. The system can chalk up the bounding box and then operate on sub-images. That is, the system may break an image into parts and treat those parts much like words in a document. The system can detect edge images of the two images 144, 146 and then divide the images 144, 1467 into a 12 by 12 cell shown symbolically at 148, 150. So each image may be a number of 3×3 subsets as discussed above with respect to the portion 210 of FIG. 6, and can be viewed as a nine-dimensional vector.

At digest create time, the system can operate on a large corpus of listing images linked to sub-images to generate vectors as described, providing a large pool of sub-images, perhaps in the millions. The system then runs a k-means clustering algorithm on the corpus of sub-images. K-means clustering is a method of cluster analysis. A k-means cluster algorithm assigns each point to the cluster whose center (also called a centroid) is nearest. The center is the average of all the points in the cluster—that is, its coordinates are the arithmetic mean for each dimension separately over all the points in the cluster.

Example

The data set has three dimensions and the cluster has two points:

X=(x1,x2,x3) and Y=(y1,y2,y3).
Then the centroid Z becomes Z=(z1,z2,z3),
Where $$z_1 = \frac{x_1 + y_1}{2}, z_2 = \frac{x_2 + y_2}{2} \text{ and } z_3 = \frac{x_3 + y_3}{2}.$$

Applying a k-means cluster algorithm, to, for example, millions of nine-dimensional vectors during digest creation will reduce the vectors to a reasonable number of centroid points, perhaps as few as one thousand to ten thousand. These centroid points can be viewed as code points in a code book for each of the respective vectors. At runtime, when a user submits an image query to the system, the system looks at each sub-image (e.g., sub-image 142 in FIG. 14B) and looks up the closest codebook vector for each sub-image. This results in breaking an image into sub-images, performing a cluster audit, determining centroids, and using the centroids as a code book. Each of the centroids can be viewed as a nine-character sequence or token. Consequently, a complex image has been broken down into a set of nine-character vectors to which standard search engine operations can now be easily applied for the image query to return a recall set. This dramatically reduces compute time for recall. In the search for similarity to the image query, the system may request the search engine to return the images that, out of millions of images, have the most tokens in common with those of the sub-images of the image query.

Query Image Comparison at Run Time Using a Multi-Pass Similarity Search

As discussed above, a listing query (also referred to as "query image") can be subsequently presented by web client 16 of FIG. 1 in order to search for images in the index database 37 that are identical or similar to the listing query. The query image, referred to herein as a pivot, is itself parsed or processed to generate multiple feature vectors or sets of index values for the query image. The index sets for the query image are thus generated in a similar manner to the way generation of index sets, or digests, are pre-computed for the index database. The digest of the query image may be compared against the digests in the index database to determine digests similar to the query image digest.

Textual information which could include, for example, title and attributes, is stored with an item and can be used in the first-pass query based on textual similarity. For example, if the textual information of a pivot item included Title="New brown Coach purse" and aspects Brand: Coach, Material: leather and Style=satchel, all these values would be passed to a RANK operator as the "text query". The RANK operator compares the text query against images stored as pre-computed digests in index database 37 using a TF-IDF like algorithm, so each term is weighted according to inverse document frequency, meaning terms that are rare have higher weight. For example, if one in two items in the handbags category contained the word "new", then "new" would have an IDF score of 2, whereas if Brand=Coach appears only 1 in 20 times in the handbags category, then this term would have a weight of 20. The RANK operator looks for items that match any of these terms, and gives a score according to number of matches and associated term weights. Then the top N items from this step can be re-sorted using a second pass sort using a second ranking method, such as a "Best Match" method like those disclosed in copending application Ser. No. 12/476,046, entitled "Methods and Systems for Deriving a Score with which Item Listings are Ordered." An example of a second pass ranking that re-sorts these top N items might use a combination of image comparison operations (for example: distance between color histograms, discussed above, cosine similarity of edge matrices, pattern comparison, and the like), textual similarity, by time (sale ending soonest); by newly listed; by price+shipping cost (lowest first); by price+shipping cost (highest first); by best match; by price (highest first); by price (lowest first), and seller or item quality measurements to produce a final ordering which is presented to users. In this case, as an example, the profiles for image similarity search can be:

$w\_1*ColorSim(colordigest)+w\_2*EdgeSim(edgedigest)+w\_3*SimilarityScore$ where
w is a weight customizable by pivot item category,
ColorSim is the distance between color digests of the two images,
EdgeSim is the distance between edge digests of the two images, and
SimilarityScore is the score computed above in the first-pass sort.

As discussed previously, both color and edge digests are represented as histograms measuring the number of pixels falling into distinct bins: for color the bins are regions of a given color space, and for edge the bins are gradients of a certain magnitude. There are many ways of finding distances between two histograms. One way is to use histogram intersection for color, and cosine similarity for edge.

Product Category Optimization in Similarity Searching

The weights "w" on each factor are optimized using feedback from users as a way of optimizing sorts by item type or category. Datasets can be used comprising idealized orderings as ranked by human judges, and/or by click-through patterns from an ecommerce website to optimize the importance of each factor to users by product category. Then when a user selects an item for a query, the optimum weights for that item's category can be used to rank the results to be presented to the user.

Figure 15:
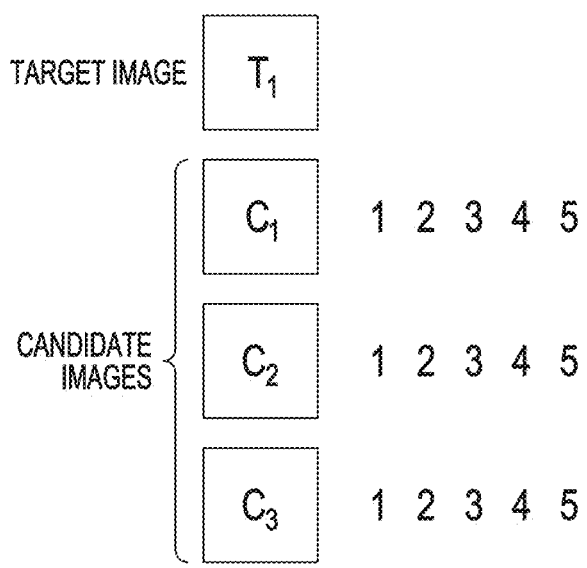
FIG. 15 is an illustration of training sets useful in product category optimization in selecting recall sets for a similarity search.

The method of obtaining weights w, above, by human judges is discussed with respect to FIG. 15. In general, the method is employed to determine the importance of each attribute of an item, sometimes referred to as a factor, to a user interested in purchasing the item. This importance may vary considerably depending on product type. Training sets can be sent to users and choices of the users are monitored. This can be done by using, as one example, a crowd sourcing website or algorithm where individuals are paid a small amount for providing an opinion. Target image T1, and a set of candidate images, C1, C2, C3 to be compared to target image T1 are provided to judges. Each candidate image has a range associated with it, such as a scale of 1 to 5, going sequentially from low to high, for example. Each judge is asked how similar a candidate, such as C2, is to the target image T1. Hundreds of thousands of judgments can be taken, every target image to every candidate image. The ecommerce system knows what categories the target images are in, and their color, shape and, at least potentially, texture. For example, the ecommerce system knows how similar the color of T1 is to, say, C1, and the color of T1 is to, say, C3, and the color of T1 to, say, C3. The same is known as to shape and the same is known as to texture, and the like. From the foregoing information, the system can calculate, for a given category, say C2, all of the target images, and the candidate comparisons and determine, for example, that the feature of the candidate that was most highly correlated with judgment scores was, for example, color. So for category C2, color would be weighted, as w, higher than, say, shape or texture. To determine the optimum combination of weights across all features, an approach such as linear regression could be used, and many other modeling techniques could also be applied. This process can be applied with item attributes like brand, material, pattern, style, size, dress length, and sleeve type, and others. The result would then be obtaining judgments that, say, for shoes people might care more about brand, whereas for dresses, people might care more about pattern, as just one example. Alternatively, the system can count click-through patterns form the ecommerce website to determine user weighting preferences of attributes for given categories.

More Like This

Figure 16:
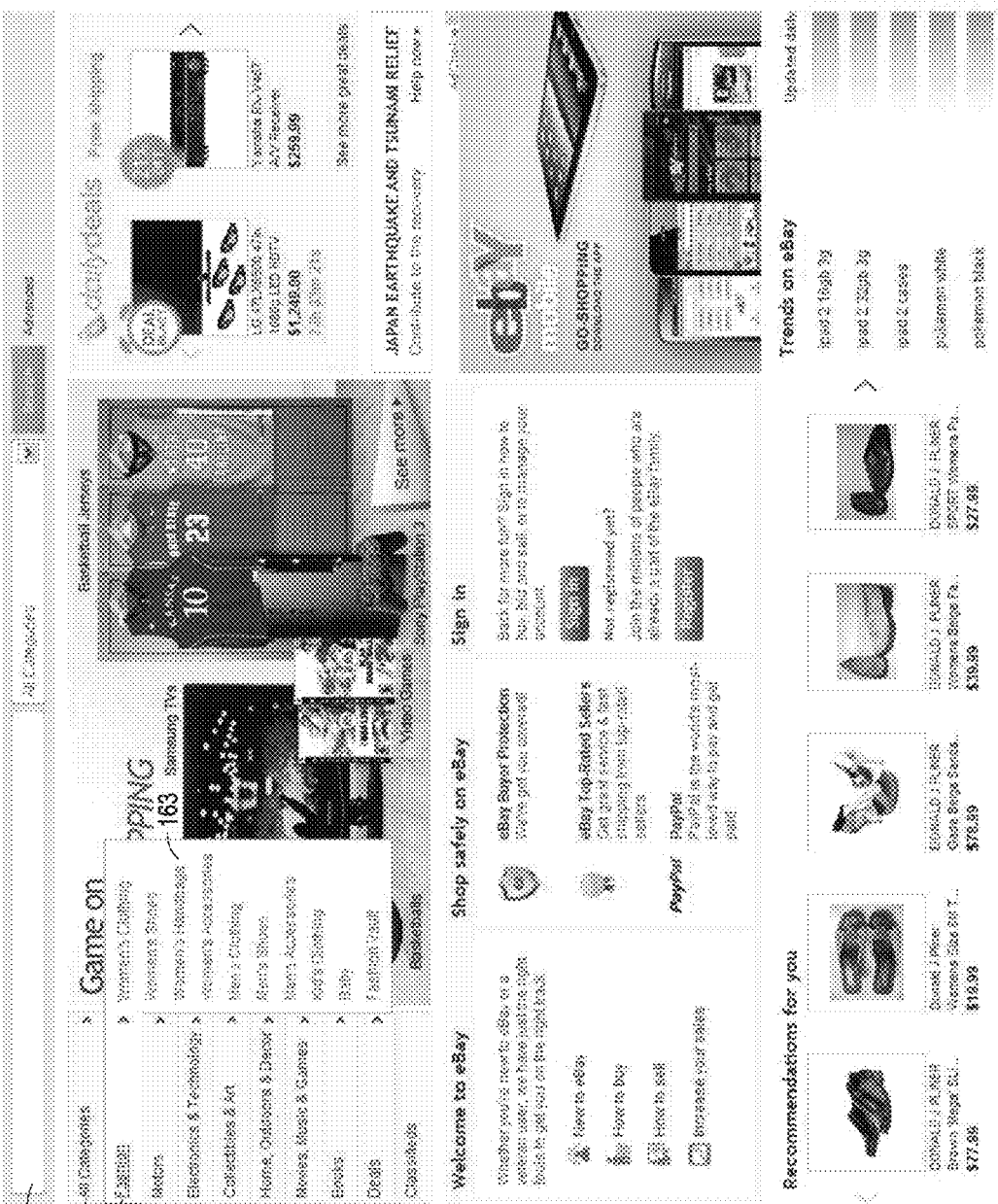
FIG. 16 is an illustration of a first ecommerce site page showing various entries for a similarity search.
Figure 18:
FIG. 18 is an illustration of a third ecommerce site page showing part of a similarity search.

An example operation of the image similarity search function described above can be seen from FIGS. 16, 17, 18, and 19. FIG. 16 shows a home page of an ecommerce website. Using a left navigation pane, one can navigate to "Fashion" button 161, "Women's Handbags" button 163, and arrive at the page seen in FIG. 17 by way of a first pass similarity search using a TF-IDF-like algorithm as discussed previously, and then a second-pass ranking of, for example, the top N results selected in the first pass similarity search to place a resulting number of similar items on the page illustrated in FIG. 17. The second pass similarity search can be done by any of a number of operators as discussed above. Each second pass similarity search yields the grouping of handbags that meets the type of second pass similarity search used to rank the top N items in the first pass similarity search. In addition, certain second pass similarity searches can be user-selected such as in FIG. 17, in which the second pass similarity search is by time: sale ending soonest as seen at "Sort By" box 171. "Sort By" box 171 can be a drop-down menu for some of the second pass similarity searches discussed above (e.g., by newly listed items; by price+shipping cost (lowest first); by price+shipping cost (highest first); by best match; by price (highest first); by price (lowest first)), which can be user-selected by clicking on choices for the foregoing that are selected through the drop down menu at box 171.

Figure 17:
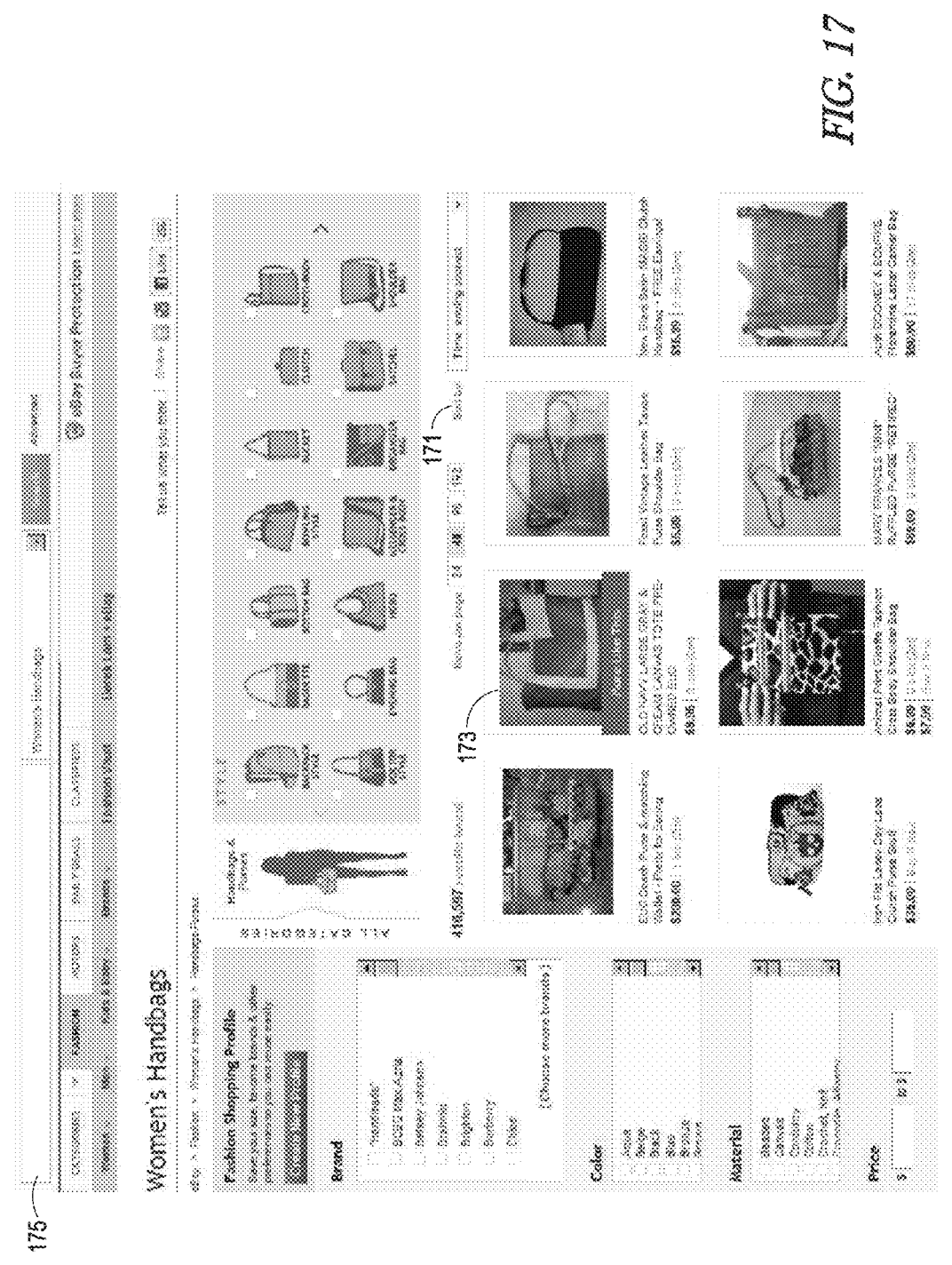

Continuing with the discussion of FIG. 17, if one hovers her mouse over any bag, such as the bag shown in image 173, a "More Like This" choice will be viewable. Selecting "More Like This" will yield a similarity search on the image 173 such as that shown in FIG. 18 where handbags similar to the one shown in image 173 appear. These bags will be determined by the above-explained edge detection, color detection, and/or texture detection, applied to the query search from the "More Like This" similarity search as discussed in detail above with reference to FIG. 17. One can continue similarity searching "More Like This" to additional depths, for example, by hovering one's mouse over image 181 of FIG. 18 and clicking again on "More Like This" for the handbag shown in the image 181, yielding yet another page of handbags (not shown), these similar to the one shown in the image 181. A test for an end signal can be made before searching to a next additional depth. If an end signal is detected, such as a user accessing an application not supported by the search, or such as the user otherwise discontinuing the search, among other end signals, the method ends. If an end signal is not detected at the test, the searching continues to at least one additional depth. A "bread crumb" trail can be kept so that the user can track her similarity searches and go back, if desired, to the handbag she likes best of the handbags discovered through various depths of "More Like This."

If desired, the "More Like This" similarity search can be designed so that one can enter the "More Like This" similarity search by way of a similarity search at "All Categories" button 165, for example, of FIG. 16, initially, and proceed to the desired category of the group of categories that can appear from selecting the "All Categories" button 165, and following the above described similarity search of "More Like This" depths. Alternatively, one can design the "More Like This" similarity search such that one can enter the similarity search by a word search, for example, by entering "Coach Leather Handbag" at the word search box 167, for example, at FIG. 16, and continue as discussed above.

The system can be designed such that at any level of the above "More Like This" similarity searches, regardless of the method of entering the search, the system can allow the user to switch from one category of item to another category of item. For example, when in the "More Like This" similarity search on FIG. 18, discussed above, instead of clicking on "More Like This" for the handbag shown in image 181, one can change the item category and enter a new similarity search for, say, women's shoes, using any of the entry points that were discussed above for the case of women's handbags, thereby beginning a new "More Like This" similarity search for the case of women's shoes, searching to any level, again subject to an end signal as discussed above. Again, a bread crumb tracking trail can be kept of the sequence of "More Like This" levels of similarity searches for women's handbags and the sequence of "More Like This" levels of similarity searches for women's shoes, so that the user can at any point, using the bread crumb tracking trail, go back and purchase any of the located women's handbags or women's shoes. Experience has shown that keeping prospective buyers in the similarity search with additional "More Like This" similarity searches to various levels and for items of various categories has been seen to lead to more sales.

Figure 19:
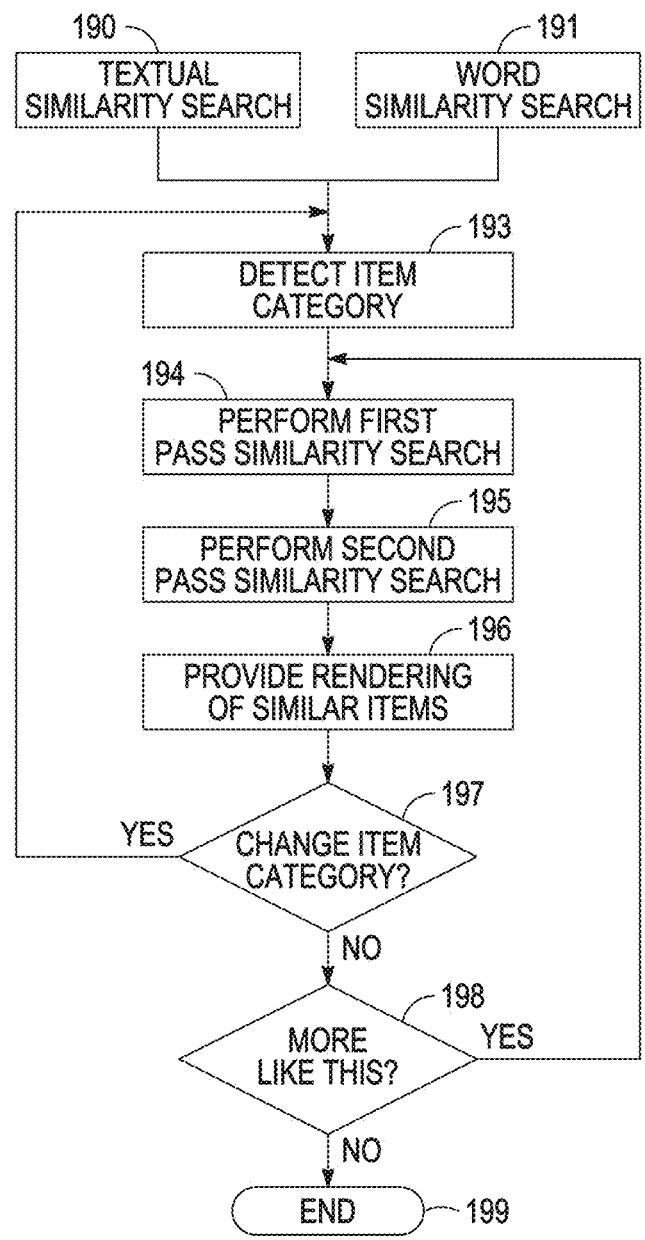
FIG. 19 is a flowchart showing various operations in a similarity search.

FIG. 19 is an illustration of the "More Like This" similarity search described above. The user may enter a search query using a textual search as discussed above at operation 190. This may be a search entry by way of the "Fashion" button 161 or may be by way of a word similarity search by entering a search term into the search box 175 of FIG. 17. As discussed above, "Textual" means text and image information to be stored about the item the seller is listing, including item title, and attributes of the item. This can be considered "structured" and "unstructured" item data. For example, unstructured data may include item title and item description, which may be data in which the seller is free to include whatever the seller wants to include. Structured data may be data such as the item category (e.g., shoes, handbags, and the like) and item aspects such as brand, material, and the like, where each piece of information can be stored as separate name-value pairs. So, if the listing item is a Coach handbag with title "New brown Coach purse", the digest may include the following terms as textual elements of a pre-computed digest (new, brown, Coach, purse, Brand: Coach, Material: leather, Style: satchel).

Continuing with the method, a textual "More Like This" search may be triggered through operation 190 of FIG. 19, which could be entered by way of, for example, the button 161 of FIG. 16. Alternatively, the search may be a word search (e.g. "pink leather brooch") entered at operation 191 of FIG. 19, which may be entered through, for example, the search box 167 of FIG. 16. In either case, the system detects the entry of the search and detect the item category of the search at operation 193, for example, by detecting that "Women's Handbags" is selected at button 163 in FIG. 16. Next, the system performs a first pass similarity search at operation 194. The system will then perform a second pass similarity search on the top N items found by the first pass similarity search. Again, the second pass similarity search at operation 195 can be performed using a best match algorithm or any of the operators discussed previously, some or all of which can be user-selectable as by way of, for example, a drop-down menu at the box 171 of FIG. 17. When the second pass similarity is completed, the system can provide one or more signals for rendering the search results at operation 196.

At this point, the system can test for an end signal and if an end signal is detected, the method ends. If no end signal is detected, the system continues to operation 197 to test for a change of item category. If the system detects a change of item category, such as the user entering a new category by any of the buttons 161, 165, or box 167 of FIG. 16, the system returns to operation 193 to detect the new item category and continues as discussed above. If, on the other hand, the user does not change item category, the system detects at decision operation 198 whether the user is entering a "More Like This" similarity search as at image 181 of FIG. 18. If the answer at operation 198 is no, the search ends at operation 199. If the answer is yes, the system returns to perform the first pass similarity search at operation 194 and continues with the rest of the search as discussed above.

It will further be appreciated that the system and methodology described above can be applied to video content as well as or instead of image data. The method may in such case include extracting images from video files, and processing the extracted images in accordance with the example embodiments described herein. Image extraction from such video content may include automatically identifying scene changes in the video content (e.g., by comparison of successive frames or images in the video content), and extracting images or frames at the start of such scene changes.

The example embodiments described herein address some of the technical challenges associated with effective processing of images linked to item listings. For instance, image databases of network-based marketplaces are often very large, comprising millions of images, so that the time and/or processing power consumed by conducting a search of image comparison in the database is prohibitive. However, a comparison of index data generated for the query image with index data of database images is considerably less resource intensive.

Modules, Components and Logic

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of some of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations thereof. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the embodiment. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Data Structures

Figure 21:
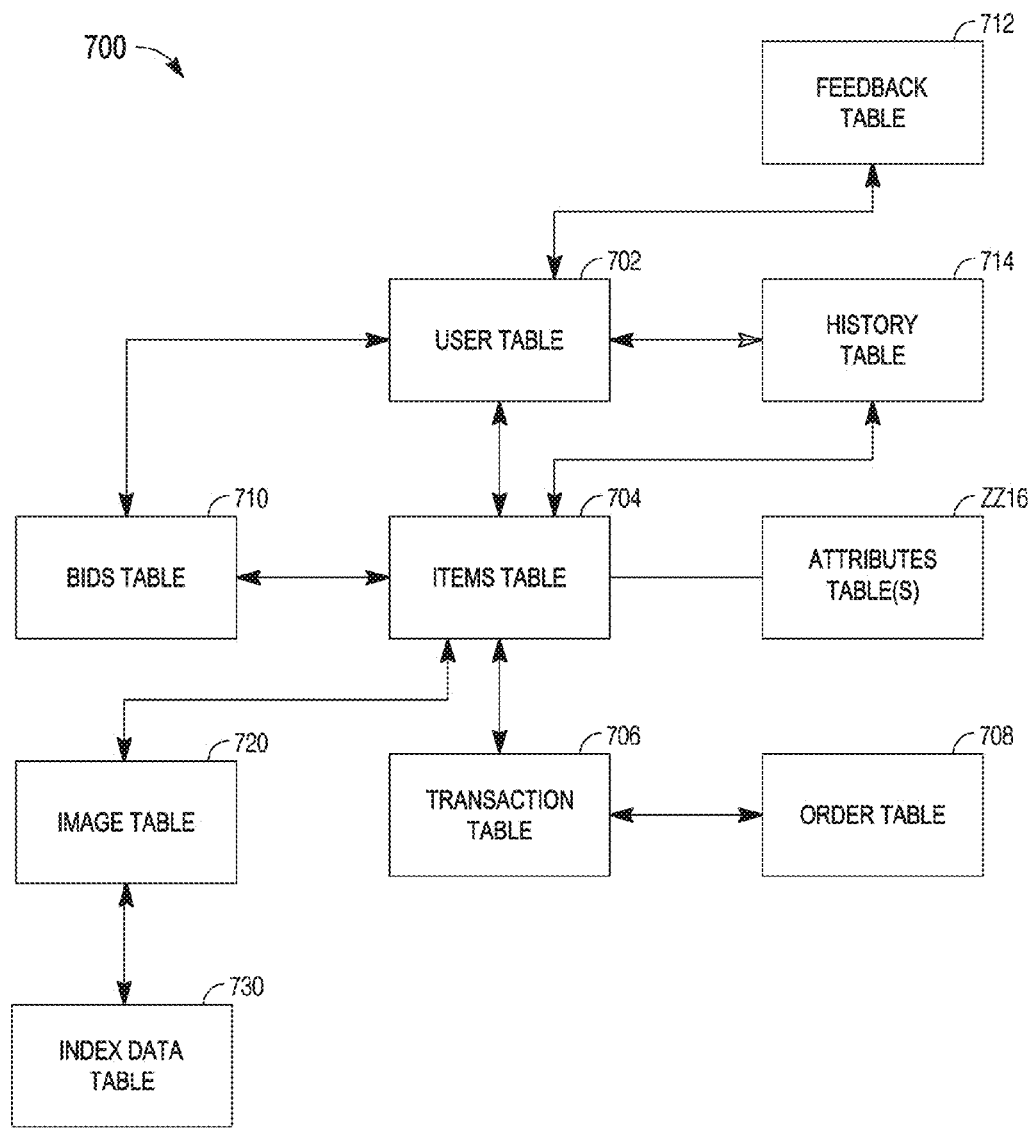
FIG. 21 is a diagrammatic view of a data structure according to an example embodiment of a network-based marketplace.

FIG. 21 is a high-level entity-relationship diagram of an example embodiment, illustrating various tables 700 that may be maintained within the databases 35 to 37, and that are utilized by and support the applications 30 and 32. A user table 702 contains a record for each registered user of the networked system 12, and may include identifier, address and financial instrument information pertaining to each such registered user. A user may operate as a seller, a buyer, or both, within the networked system 12. In one example embodiment, a buyer may be a user that has accumulated value (e.g., commercial or proprietary currency), and is accordingly able to exchange the accumulated value for items that are offered for sale by the networked system 12.

The tables 700 also include an items table 704 in which are maintained item records for goods and services that are available to be, or have been, transacted via the networked system 12. Each item record within the items table 704 may furthermore be linked to one or more user records within the user table 702, so as to associate a seller and one or more actual or potential buyers with each item record.

The items table 704 may be connected to an image table which contains images associated with the respective items or item listings in the items table 704. The image table 720 is in turn connected to an index data table 730 which contains index data as described in detail above.

A transaction table 706 contains a record for each transaction (e.g., a purchase or sale transaction) pertaining to items for which records exist within the items table 704.

An order table 708 is populated with order records, each order record being associated with an order. Each order, in turn, may be with respect to one or more transactions for which records exist within the transaction table 706.

Bid records within a bids table 710 each relate to a bid received at the networked system 12 in connection with an auction-format listing supported by an auction application 32. A feedback table 712 is utilized by one or more reputation applications 50, in one example embodiment, to construct and maintain reputation information concerning users. A history table 714 maintains a history of transactions to which a user has been a party. One or more attributes tables 716 record attribute information pertaining to items for which records exist within the items table 704. Considering only a single example of such an attribute, the attributes tables 716 may indicate a currency attribute associated with a particular item, the currency attribute identifying the currency of a price for the relevant item as specified in by a seller.

Figure 20:
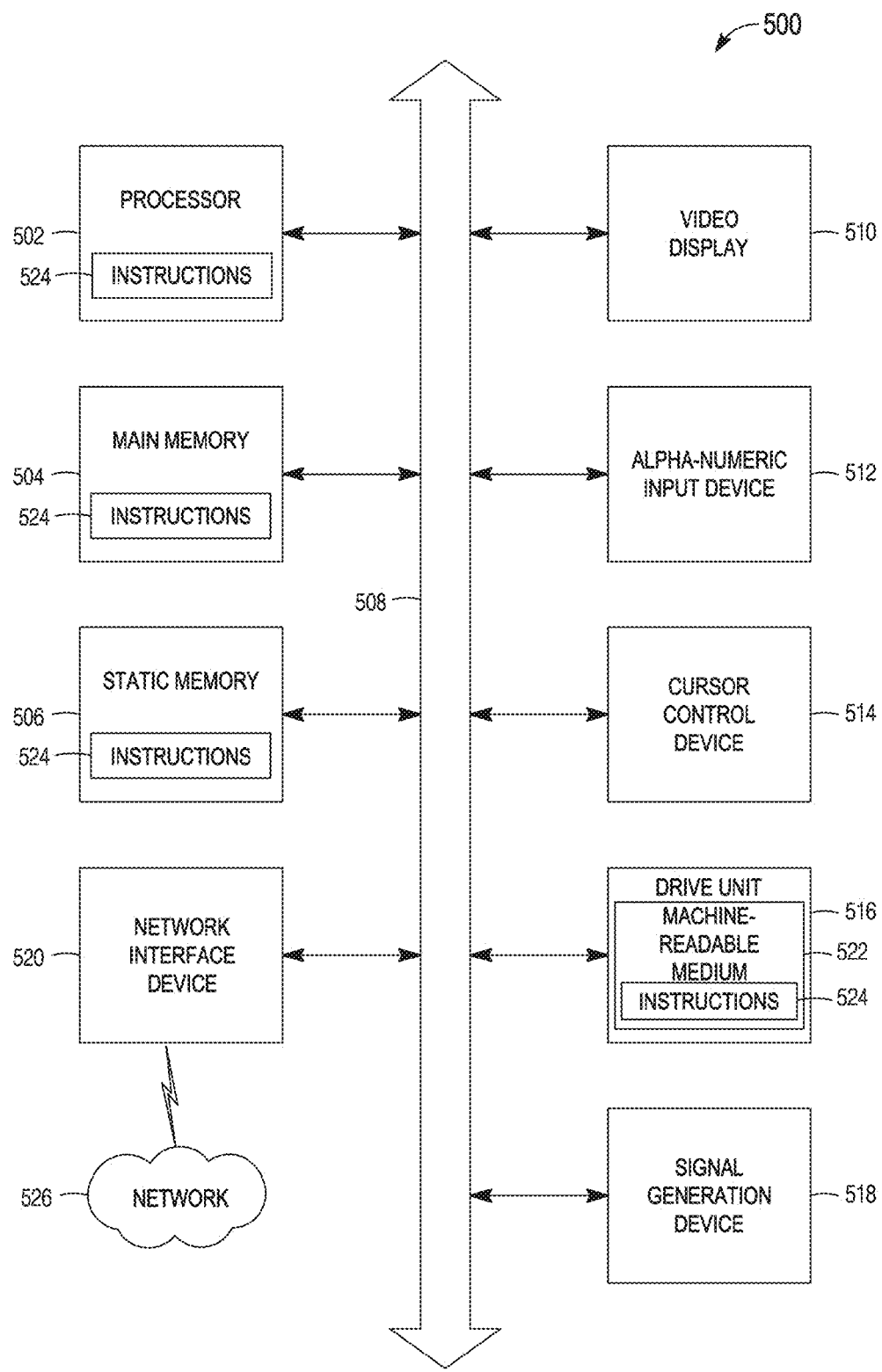
FIG. 20 is a block diagram of a machine in the example form of a computer system within which a set of instructions, for causing the machine to perform any one or more of the methodologies discussed herein, may be executed.

FIG. 20 shows a diagrammatic representation of a machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

Thus, a method and system to index images and to perform an image-based search in a network-based marketplace have been described. Although the present method and system have been described with reference to specific example embodiments, it will be evident that various modifications and changes may be made to these embodiments without departing from the broader spirit and scope of the application. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving from a client machine an image query for a desired product that is listed for sale;
   computing a first digest of the image query;
   determining, based on the first digest, textual information that describes the desired product;
   using the determined textual information as a search parameter, performing a first database textual similarity search of second digests of products listed for sale, the second digests being computed before receipt of the query from the client machine, and comprising both image features and textual information of the products, to find first images of products that satisfy the search parameter;
   providing to the client machine a plurality of the first images of products that result from the first textual similarity search, and at least one first selectable icon that, when selected, causes a request to find more images of products similar to at least one of the plurality of first images of products;
   responsive to selection of one of the at least one first selectable icon, and using textual information related to the at least one of the plurality of first images of products, performing a second textual similarity search of the second digests for second images of products similar to the at least one of the plurality of first images of products; and
   providing to the client machine a plurality of the second images of products that result from the second database textual similarity search.

2. The method of claim 1 wherein at least one of the plurality of first images of products or at least one of the plurality of the second images of products comprises video content.

3. The method of claim 1 wherein the determined textual information is one of textual information specified by a seller of the product or textual information generated by an ecommerce system.

4. The method of claim 1 wherein the plurality of the second images of products comprise pixels, and similarity of the second images of products to the at least one of the plurality of first images of products is determined by using textual information associated with the at least one of the plurality of first images of products as a search parameter.

5. The method of claim 4 the textual information comprises at least one of product title or product attributes.

6. One or more computer-readable hardware storage device having embedded therein a set of instructions which, when executed by one or more processors of a computer, causes the computer to execute operations comprising:
   receiving from a client machine an image query for a desired product that is listed for sale;
   computing a first digest of the image query;
   determining, based on the first digest, textual information that desired product;
   using the determined textual information as a search parameter, performing a first database textual similarity search of second digests of products listed for sale, the second digests being computed before receipt of the query from the client machine, and comprising both image features and textual information of the products, to find first images of products that satisfy the search parameter;
   providing to the client machine a plurality of the first images of products that result from the first textual similarity search, and at least one first selectable icon that, when selected, causes a request to find more images of products similar to at least one of the plurality of first images of products;
   responsive to selection of one of the at least one first selectable icon, and using textual information related to the at least one of the plurality of first images of products, performing a second textual similarity search of the second digests for second images of products similar to the at least one of the plurality of first images of products; and
   providing to the client machine a plurality of the second images of products that result from the second database textual similarity search.

7. The one or more computer-readable hardware storage device of claim 6 wherein at least one of the plurality of first images of products or at least one of the plurality of the second images of products comprises video content.

8. The one or more computer-readable hardware storage device of claim 6 wherein the textual information related to the query is one of textual information specified by a seller of the product or textual information generated by an ecommerce system.

9. The one or more computer-readable hardware storage device of claim 6 wherein the plurality of the second images of products comprise pixels, and similarity of the second images of products to the at least one of the plurality of first images of products is determined by using textual information associated with the at least one of the plurality of first images of products as a search parameter.

10. The one or more computer-readable hardware storage device of claim 9 wherein the textual information comprises at least one of product title or product attributes.

11. A system comprising:
one or more computer processors and storage configured to:
receive from a client machine an image query for a desired product that is listed for sale;
compute a first digest of the image query;
determine, based on the first digest, textual information that describes the desired product;
by use of determined textual information as a search parameter, perform a first database textual similarity search of second digests of products listed for sale, the second digests being computed before receipt of the query from the client machine, and comprising both image features and textual information of the products, to find first images of products that satisfy the search parameter;
provide to the client machine a plurality of the first images of products that result from the first database textual similarity search, and at least one first selectable icon that, when selected, causes a request to find more images of products similar to at least one of the plurality of first images of products;
responsive to selection of one of the at least one first selectable icon, by use of the textual information related to the at least one of the plurality of first images of products, perform a second database textual similarity search of the second digests for second images of products similar to the at least one of the plurality of first images of products; and
provide to the client machine a plurality of the second images of products that result from the second database textual similarity search.

12. The system of claim 11 wherein the textual information is one of text information specified by a seller of the product or textual information generated by an ecommerce system.

13. The system of claim 11 wherein at least one of the plurality of first images of products or at least one of the plurality of the second images of products comprises video content.

14. The system of claim 11 wherein the plurality of the second images of products comprise pixels, and similarity of the second images of products to the at least one of the plurality of first images of products is determined by use of textual information associated with the at least one of the plurality of first images of products as a search parameter.

* * * * *

UNITED STATES PATENT AND TRADEMARK OFFICE
CERTIFICATE OF CORRECTION

| | | |
|---|---|---|
| PATENT NO. | : 9,715,510 B2 | Page 1 of 1 |
| APPLICATION NO. | : 15/266093 | |
| DATED | : July 25, 2017 | |
| INVENTOR(S) | : Naren Chittar et al. | |

It is certified that error appears in the above-identified patent and that said Letters Patent is hereby corrected as shown below:

In the Claims

In Column 30, Line 26, in Claim 5, after "4" insert -- wherein --.

In Column 30, Line 37, in Claim 6, after "that" insert -- describes the --.

Signed and Sealed this
Nineteenth Day of September, 2017

Joseph Matal
*Performing the Functions and Duties of the
Under Secretary of Commerce for Intellectual Property and
Director of the United States Patent and Trademark Office*